(12) United States Patent
Majewski et al.

(10) Patent No.: US 10,372,107 B2
(45) Date of Patent: Aug. 6, 2019

(54) CUSTOM PROPERTIES IN AN APPLICATION ENVIRONMENT

(71) Applicant: Rockwell Automation Technologies, Inc., Mayfield Heights, OH (US)

(72) Inventors: Lorenzo Majewski, Waukesha, WI (US); Norman Weatherhead, Ayr (CA); Stephen P. Proctor, Randburg (ZA); Phillip F. Pemberton, Gauteng (ZA); Douglas W. Reid, Mentor, OH (US); Michael Kalan, Highland Heights, OH (US); Christopher E. Stanek, Willoughby, OH (US); Daniel DeYoung, Hudson, OH (US); Andrew R. Stump, Mentor, OH (US); Robert Guenther, Linden (DE); Joachim Thomsen, Singapore (SG); Danie Beckett, Gauteng (ZA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 911 days.

(21) Appl. No.: 14/515,195

(22) Filed: Oct. 15, 2014

(65) Prior Publication Data
US 2016/0109875 A1   Apr. 21, 2016

(51) Int. Cl.
| | | |
|---|---|---|
| *G06F 21/62* | (2013.01) | |
| *G05B 19/042* | (2006.01) | |
| *G05B 19/4097* | (2006.01) | |

(52) U.S. Cl.
CPC ..... *G05B 19/4097* (2013.01); *G05B 19/0426* (2013.01); *G06F 21/6218* (2013.01);
(Continued)

(58) Field of Classification Search
CPC .. G06Q 10/06; G06F 8/20; G06F 8/10; G06F 8/71; G06F 8/36; G06F 9/445;
(Continued)

(56) References Cited

U.S. PATENT DOCUMENTS

| | | | | |
|---|---|---|---|---|
| 7,711,753 B2* | 5/2010 | Krishnaswamy | ..... | G06F 9/4488 707/802 |
| 8,352,905 B2* | 1/2013 | Chouinard | ................ | G06F 8/20 717/100 |

(Continued)

FOREIGN PATENT DOCUMENTS

| | | |
|---|---|---|
| CN | 1945473 A | 4/2007 |
| CN | 101739007 A | 6/2010 |

(Continued)

OTHER PUBLICATIONS

"Logix5000 Controllers Add-On Instructions", Rockwell Automation Programming Manual, Publication 1756-PM010E-EN-P—Sep. 2012, 100 pages.

(Continued)

*Primary Examiner* — Marina Lee
(74) *Attorney, Agent, or Firm* — Amin, Turocy & Watson, LLP

(57) ABSTRACT

The disclosed subject matter comprises a design management component that facilitates managing and storing information, including respective customized information of respective entities and/or relating to objects, projects, controllers, or industrial automation systems within a project file or controller. The design management component facilitates enabling custom data, including custom metadata, to be injected by object into a project file or in a controller associated with the project file. The design management component operates with a data management component that can allow respective entities to view, edit, or delete their respective data on objects associated with a project file or
(Continued)

controller in accordance with their respective rules. The design management component facilitates desired library management, version management, virtualization of a system for emulation and testing, data exchange between application, and application development and management in relation to controllers, devices, or components, in connection with control of industrial automation systems.

27 Claims, 14 Drawing Sheets

(52) U.S. Cl.
CPC ............... *G06F 21/6227* (2013.01); *G05B 2219/35012* (2013.01); *Y02P 90/265* (2015.11)

(58) Field of Classification Search
CPC ............ G06F 21/6218; G06F 21/6227; G05B 19/4097; G05B 19/4026; G05B 2219/35012; Y02P 90/265
USPC .......................................... 717/100–135, 170
See application file for complete search history.

(56) References Cited

U.S. PATENT DOCUMENTS

| | | | | |
|---|---|---|---|---|
| 8,438,191 | B1* | 5/2013 | Chand | G06F 8/10 707/803 |
| 8,726,378 | B2* | 5/2014 | de Oliveira | G06F 21/56 713/168 |
| 9,031,975 | B2* | 5/2015 | Weatherhead | G06F 17/30 707/769 |
| 9,135,000 | B2* | 9/2015 | Weatherhead | G06F 8/36 |
| 9,563,861 | B2* | 2/2017 | Weatherhead | G06Q 10/06 |
| 2006/0178778 | A1 | 8/2006 | Fuhlbrigge et al. | |
| 2007/0055385 | A1* | 3/2007 | Mann | G05B 19/042 700/1 |
| 2008/0195651 | A1* | 8/2008 | Rachmiel | G06F 21/604 |
| 2010/0083279 | A1* | 4/2010 | Kowal | G05B 19/0426 719/315 |
| 2011/0224808 | A1 | 9/2011 | Lucas et al. | |
| 2013/0006395 | A1* | 1/2013 | Plache | G05B 19/0426 700/83 |
| 2013/0110914 | A1* | 5/2013 | Heuer | G06F 8/35 709/203 |
| 2013/0123946 | A1* | 5/2013 | Govindaraj | G05B 19/054 700/19 |
| 2013/0123951 | A1* | 5/2013 | Daily | G05B 23/0216 700/79 |
| 2013/0123952 | A1* | 5/2013 | Reid | G05B 19/054 700/83 |
| 2013/0123954 | A1* | 5/2013 | Reid | G05B 19/042 700/83 |
| 2013/0131840 | A1* | 5/2013 | Govindaraj | G05B 19/41865 700/19 |
| 2014/0129005 | A1 | 5/2014 | Weatherhead et al. | |
| 2014/0129550 | A1* | 5/2014 | Weatherhead | G06F 17/30 707/723 |
| 2014/0343918 | A1* | 11/2014 | Grgic | G05B 19/042 703/23 |
| 2015/0106753 | A1* | 4/2015 | Tran | G05B 23/0272 715/765 |
| 2015/0161193 | A1* | 6/2015 | Damodar | G06F 16/2365 707/694 |
| 2016/0109875 | A1* | 4/2016 | Majewski | G06F 21/6218 700/98 |
| 2017/0351980 | A1* | 12/2017 | Binder | G06Q 10/067 |
| 2018/0089337 | A1* | 3/2018 | Uppunda | G06F 17/50 |

FOREIGN PATENT DOCUMENTS

| | | |
|---|---|---|
| CN | 102243582 A | 11/2011 |
| EP | 1 770 463 A1 | 4/2007 |

OTHER PUBLICATIONS

"Logix5000 Controllers Nonvolatile Memory Card", Rockwell Automation Programming Manual, Publication 1756-PM017E-EN-P—Nov. 2012, 32 pages.

"Welcome to Visual Studio 2013", Microsoft, 2013, published online at [http://msdn.microsoft.com/en-us/library/dd831853.aspx], retrieved on Jan. 14, 2015, 1 page.

"Studio 5000 Logix Designer Automation Productivity" Rockwell Automation Slideshow, Rev 5058-CO900E, Jun. 24, 2014, published online at [http://www.slideshare.net/RockwellAutomation/rockwell-software-studio-5000-logix-designer], retrieved Jan. 15, 2015, 39 pages.

Extended European Search Report for EP Application Serial No. 15189743.6, dated Jun. 10, 2016, 7 pages.

European Office Action for EP Application Serial No. 15189743.6, dated Jul. 18, 2016, 2 pages.

Chinese Office Action and English Translation thereof dated Aug. 28, 2017 for Chinese Application Serial No. 201510672113.0, 24 pages.

Communication Pursuant to Article 94(3) EPC for EP Application Serial No. 15189743.6, dated Apr. 21, 2017, 5 pages.

\* cited by examiner

```xml
<CustomProperties>

<Provider ID="TPTool">
    <Public WarnOnEdit="true">
      <Caption><![CDATA[This is part of a modular object]]></Caption>
      <EditWarning>
        <LocalizedWoE Lang="en-US">
        <![CDATA[Multiple language support]]>
        </LocalizedWoE>
        <LocalizedWoE Lang="ar-SA">
        <![CDATA[]]>
        </LocalizedWoE>
        <LocalizedWoE Lang="el-GR">
        <![CDATA[ΕΛληνικά (Ελλάδα)]]>
        </LocalizedWoE>
        <LocalizedWoE Lang="ko-KR">
        <![CDATA[한국어 (대한민국)]]>
        </LocalizedWoE>
      </EditWarning>
    </Public>
    <ObjectKey MappingType="Definition" ObjectType="Module"
                    ObjectKeyValue="Definition_VirtualHW_Axes_0" />
    <ObjectKey MappingType="Action" ObjectType="DataType"
                    ObjectKeyValue="Action_VirtualHW_Axes_1" />
    <OtherStuff><![CDATA[Custom Additional Info]]></OtherStuff>
  </Provider>

<Provider ID="GEMS">
    <Stuff><![CDATA[Custom Info]]></Stuff>
  </Provider>

<Provider ID="OtherProvider">
    <Stuff><![CDATA[Custom Info]]></Stuff>
  </Provider>

</CustomProperties>
```

FIG. 6

CUSTOM PROPERTIES IN AN APPLICATION ENVIRONMENT

TECHNICAL STATEMENT

The subject disclosure generally relates to industrial automation systems, and more specifically, to custom properties in an application environment associated with an industrial automation system.

BACKGROUND

Industrial automation systems can perform various processes to produce desired products or processed materials. An industrial control system can comprise various industrial devices, industrial processes, other industrial assets, and network-related assets (e.g., communication network devices and software).

Industrial controllers and their associated input/output (I/O) devices can be useful to the operation of modern industrial automation systems. These industrial controllers can interact with field devices on the plant floor to control automated processes relating to such objectives as product manufacture, material handling, batch processing, supervisory control, and other such applications. Industrial controllers can store and execute user-defined control programs to effect decision-making in connection with the controlled process. Such programs can include, but are not limited to, ladder logic, sequential function charts, function block diagrams, structured text, or other such programming structures. In general, industrial controllers can read input data from sensors and metering devices that can provide discreet and telemetric data regarding one or more states of the controlled system, and can generate control outputs based on these inputs in accordance with the user-defined program.

To facilitate operation of an industrial automation system, a design and/or control platform can be employed to facilitate the design, control, and/or maintenance of the industrial automation system. Some design and/or control platforms can allow for the design, programming, or configuring of industrial devices or other components relating to an industrial automation system (e.g., controllers, HMIs, applications, libraries, objects, etc.).

The above-described description is merely intended to provide a contextual overview relating to industrial automation systems, and is not intended to be exhaustive.

SUMMARY

The following presents a simplified summary in order to provide a basic understanding of some aspects of the subject disclosure. This summary is not an extensive overview, and it is not intended to identify key/critical elements of the subject disclosure or to delineate any scope. The sole purpose of this summary is to present some concepts in a simplified form as a prelude to the more detailed description that is presented later.

The disclosed subject matter can be employed to facilitate the design, configuration, and programming of controllers, or other devices and components, and to manage information associated with the design, configuration, and programming of industrial devices and components, in connection with industrial automation systems. In accordance with various aspects and implementations of the disclosed subject matter, a design management component can facilitate managing and storing information, including respective customized information of respective users, or relating to objects, projects, controllers, or industrial automation systems within a project file(s) or the controller(s). The design management component can facilitate enabling custom data, including custom metadata (e.g., custom extensible markup language (XML) data), to be associated, injected, embedded, or integrated into or with an object (e.g., a controller, a tag, a member, an add-on instruction (AOI), a program, a subprogram level object, etc.) by object into the project file or (e.g., optionally) in the controller associated with the project file. The design management component also can operate in conjunction with a data management component that can allow respective authorized entities (e.g., users, applications) to view, edit, or delete their respective data on objects associated with a project file or controller in accordance with their respective rules. The design management component can facilitate desired library management, version management, virtualization of a system for emulation and testing, data exchange between application, and application development and management in relation to controllers, devices, or components, in connection with control of industrial automation systems.

In accordance with various aspects, the disclosed subject matter can comprise a system that comprises a memory that stores computer-executable components; and a processor, operatively coupled to the memory, that executes computer-executable components, the computer-executable components. The computer-executable components can comprise a data store that stores a project file comprising a set of objects that is usable to facilitate control of an industrial automation system. The computer-executable components can comprise a design management component that embeds a set of data with an object of the set of objects, wherein the object, including the set of data embedded with the object, is stored in the project file in the data store.

In accordance with various other aspects, the disclosed subject matter can comprise a method comprising embedding, by a system comprising a processor, a set of data relating to an object with the object, wherein the object is associated with a project file that relates to an industrial automation system; and storing, by the system, the object, including the set of data embedded with the object, in the project file, wherein information, comprising the object, stored in the project file is usable to facilitate controlling the industrial automation system.

In accordance with still other aspects, the disclosed subject matter can comprise a non-transitory computer-readable medium storing instructions that, in response to execution, cause a system comprising a processor to perform operations. The operations can comprise integrating a set of data relating to an object with the object to generate a data-integrated object, wherein the object is associated with a project file associated with an industrial automation system. The operations also can comprise storing the data-integrated object in the project file, wherein information, comprising the data-integrated object, stored in the project file is usable to facilitate controlling the industrial automation system, and wherein the set of data integrated with the data-integrated object provides contextual information relating to the data-integrated object.

To the accomplishment of the foregoing and related ends, certain illustrative aspects of the disclosed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 6 presents an image of example custom metadata syntax that can be employed by a design management component, in accordance with various aspects and embodiments of the disclosed subject matter.

DETAILED DESCRIPTION

Figure 1:
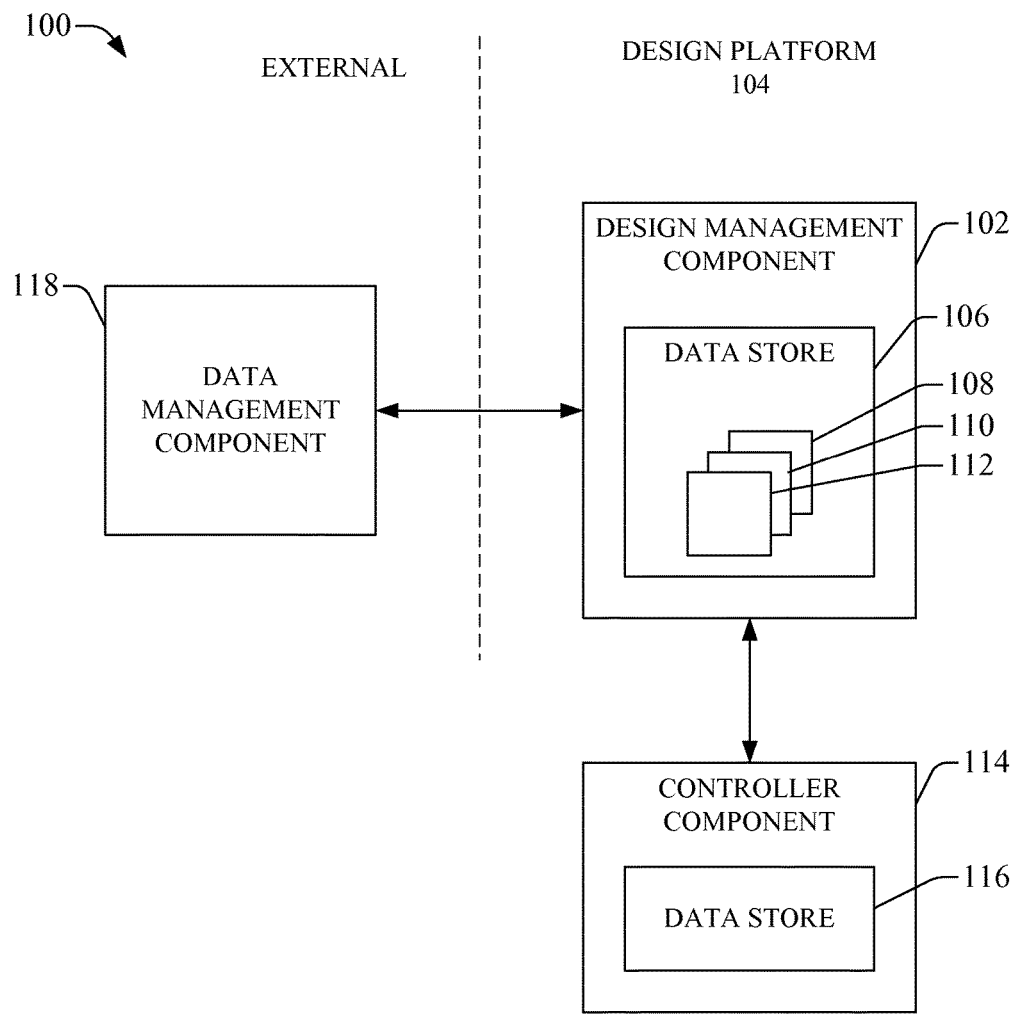
FIG. 1 a block diagram of an example system that can facilitate the design, configuration, and programming of controllers, other devices, and/or components, and to manage information associated with the design, configuration, and programming of controllers, other devices, and/or components, in connection with industrial automation systems, in accordance with various aspects and embodiments.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

To facilitate operation of an industrial automation system, a design and/or control platform can be employed to facilitate the design, control, and/or maintenance of the industrial automation system. Some design and/or control platforms can allow for the design, programming, or configuring of industrial devices or other components relating to an industrial automation system (e.g., controllers, HMIs, applications, libraries, objects, etc.).

Conventionally, when working on a project relating to a controller or industrial automation system, certain types of data have been managed outside of the project file or controller, while certain other types of data have been managed and stored in the project file or controller. For instance, if a user wanted to control a motor, the user can use an application to write out the control logic to represent how the user wants the motor to be controlled. If the user wanted to instantiate many motors (e.g., a thousand motors) in a system, the user can draft certain information to indicate, for example, where the motors are to be within the controller, how the bulk instantiation of the motors is to be controlled, what is the name(s) related to the bulk instantiation of the motors, etc. Typically, this certain information relating to this bulk instantiation resides and is managed outside of the project file or controller. For example, the user can have a library system that can be external to the project file and controller, wherein the user can store and maintain information relating to motor control or other design features of an industrial automation system.

If the user subsequently wanted to make any changes to the motor control, the user would have to go through an inefficient multi-step process to make changes to information stored in the project file or controller that relate to the changes being made to the motor control, and to also make changes to other information relating to the changes being made to the motor control that is stored and managed outside of the project file. For instance, such a process can involve the user making changes to the information stored in the project file to make the changes to the motor control, exporting information relating to the changes made to the motor control that is associated with the project file, making corresponding changes to certain other information relating to the motor control that is stored and managed outside of the project file in order to reflect the changes made to the motor control, and/or perform other operations in order to have the information that is managed outside of the project file or controller correlate with the information relating to the changed motor control that is stored in the project file or controller.

One problem with conventional systems and methods is that, since some of the information resides in and is managed in the project file or controller, and other information relating to the project resides and is managed outside of the project file, there is a potential risk that the other information that is managed outside of the project file may not be available or may not correlate with the information that is managed in the project file or controller. For instance, there can be information relating a current version of the motor control stored in the project file or controller, while other information, which is stored and managed outside of the project file, may relate to an earlier version (and invalid version) of the motor control. As a result, there can be various problems that can arise with respect to the project, controller, or industrial automation system, if there is a lack of synchronization between the information maintained within the project file or controller and the other information maintained outside of the project file or controller, for example, if the information relating to the earlier, invalid version of the motor control is used or relied upon in managing or modifying the project file or managing the controller.

Also, conventionally, when managing information outside of the project file or controller, respective users typically used their own external tools to manage such information outside of the project file or controller. Different types of external tools can differ significantly in functionality and ease of use. Generally, the more functionality an external tool offers, the more complex the external tool is and the more difficult it can be for a user to use. Conversely, an external tool that offers less functionality may be somewhat easier to use, however, it typically can be lacking in functionality, so it may not be as useful or desirable in managing the information externally. It can be desirable overcome such deficiencies in conventional systems and methods in order to efficiently integrate, share, and persist data between a design platform and external productivity tools.

To overcome deficiencies of conventional systems and methods, the disclosed subject matter can be employed to facilitate the design, configuration, and programming of controllers, or other devices and components, and to manage information associated with the design, configuration, and programming of industrial devices and components, in connection with industrial automation systems. In accordance with various aspects and implementations of the disclosed subject matter, a design management component can facilitate managing and storing information, including respective customized information of respective authorized entities (e.g., users, applications), or relating to objects, projects, controllers, or industrial automation systems within a project file(s) or the controller(s). The design management component can facilitate enabling custom data, including custom metadata (e.g., custom extensible markup language (XML) data), to be associated, injected, embedded, or integrated into an object (e.g., a controller, a tag, a member, an add-on instruction (AOI), a program, a routine, a ladder rung in a program, etc.) by object (e.g., respective custom data associated or embedded with respective objects) into the project file or (e.g., optionally) in the controller associated with the project file. The design management component also can operate in conjunction with a data management component that can allow respective users to view, edit, or delete their respective data on objects associated with a project file or controller in accordance with their respective rules. The design management component can facilitate desired library management, version management, virtualization of a system for emulation and testing, data exchange between application, application development and management in relation to controllers, devices, or components, and performance of other functions, in connection with control of industrial automation systems.

As used in this application, the terms "component," "system," "platform," "layer," "controller," "terminal," "station," "node," "interface", "HMI", "client", and the like, can refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

In accordance with various embodiments, one or more controllers can be employed in industrial automation system (e.g., an industrial control system). A controller can be embodied in a programmable automation controller (PAC), which can be a dedicated programmable logic controller (PLC), a personal computer (PC)-based controller, or the like. It is to be noted that a controller (e.g., PLC) can be a dedicated piece of hardware that is self contained or, in the case of a "soft controller" (e.g., "soft PLC"), a piece of software that runs on a computer and provides controller-like control. For instance, in the case of a soft controller, code can be extracted by the soft controller to access a project database directly to extract name information.

A terminal can communicate with the controller and/or other devices, such as an input/output (I/O) module, drives, motion controllers, process instruments, sensors, etc., in or associated with a control platform associated with the industrial control system. Control code and control data structures in the control platform can represent control logic that can administer equipment, and related processes, functionally coupled to the control platform. In an aspect, control platform is an industrial automation control environment and the control logic is automation control logic. To facilitate operation of the control system, control logic can be developed during design time, wherein the control logic can be implemented (e.g., executed) at run time. During design time (e.g., in the design environment), in an aspect, instruction(s), data type(s), and metadata tag(s) that comprise control code can be produced and retained as part of configuration, or composition, of a control project or application for use in operations for the control system (e.g., during run time).

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the terms "set" or "subset" as employed herein exclude the empty set; e.g., the set with no elements therein. Thus, a "set" or a "subset" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a block diagram of an example system 100 that can facilitate the design, configuration, and programming of controllers, other devices, and/or components, and to manage information associated with the design, configuration, and programming of controllers, other devices, and/or components, in connection with industrial automation systems, in accordance with various aspects and embodiments. The system 100 can comprise a design management component 102 that can be part of or associated with a design platform 104 that can be employed to facilitate designing, configuring, and programming controllers, other devices, and/or components, and to manage information associated with designing, configuring, and programming controllers, other devices, and/or components, in connection with industrial automation systems. The design management component 102 can comprise a data store 106 that can comprise a desired amount of memory that can be used to store the information associated with designing, configuring, and programming controllers, other devices, and/or components. The data store 106 can store a desired number of project files (e.g., design project files), comprising, for example, project file 108, project file 110, and project file 112, that can be associated with respective entities (e.g., users, applications), respective projects, and/or respective controller components, wherein respective subsets of information can be stored in the respective project files (e.g., 108, 110, 112) in the data store 106. A project file can comprise a set of files (e.g., object files) that can comprise respective subsets of information (e.g., respective objects and respectively associated subsets of custom data, which can be associated with respective entities or respective groups of entities).

The system 100 also can comprise one or more controller components, such as, for example, controller component 114, that can be used to facilitate control and operation of an industrial automation system(s). A controller component 114 can comprise one or more controllers (e.g., PLCs) that can be employed to control devices (e.g., a roller, a station, a welder, a scanner, a belt conveyor, etc.) or processes (e.g., mixing process, extruding process, injection molding process, welding process, melting process, baking process, stirring process, measuring process, etc.) of an industrial automation system in an industrial environment. Devices also are referred to herein as industrial devices or automation devices. For instance, the controller component 114 can be employed to control operation of industrial devices and industrial processes in a controlled system portion (e.g., the portion of an industrial automation system being controlled by the controller component 114) of the industrial environment.

The controller component 114 also can comprise a data store 116 that can be used to store data. As desired (e.g., optionally), the data store 116 of the controller component 114 can be used to store information associated with designing, configuring, and programming controllers, other devices, and/or components associated with an industrial automation system(s). For instance, the data store 116 of the controller component 114 can store a project file (e.g., 108) that can be associated with respective authorized entities (e.g., users, applications), respective projects, and/or respective controller components, wherein respective subsets of information can be stored in the respective project files (e.g., 108, 110, and/or 112) in the data store 116.

The design management component 102 can be associated with (e.g., communicatively connected to) a data management component 118 that can, for example, reside external to the design platform 104. The data management component 118 can be associated with and used by one or more entities to facilitate gaining access to and exchanging data with the design management component 102 or an associated controller component 114. The design management component 102 and data management component 118 can each comprise respective interface components, tools, mechanisms, etc., that can be employed to interface the design management component 102 with the data management component 118 and facilitate communication of data between the design management component 102 with the data management component 118. Respective authorized entities can employ respective data management components 118 to facilitate accessing the design management component 102.

Entities can find it desirable to associate useful and/or user-unique information with objects (e.g., a controller component 114, tags, a member, an AOI, a program, a routine, a ladder rung in a program, or other components) associated with a controller component 114 or an associated industrial automation system. The design management component 102 can operate in conjunction with the data management component 118 to enable respective authorized entities to view, add, edit, or delete their respective data on or from objects (e.g., by object) associated with a project file (e.g., 108, 110, and/or 112) or the controller component 114 in accordance with their respective rules (e.g., respective business rules associated with respective entities). The design management component 102 can facilitate managing and storing information, including respective customized information of respective authorized entities, relating to a project, controller component 114, or industrial automation system within respective project files (e.g., 108, 110, and/or 112) of respective authorized entities in the data store 106 or in the data store 116 of the controller component 114.

For example, the design management component 102 can facilitate enabling custom data (e.g., respective data customized or tailored by respective authorized entities, wherein the custom data can comprise, for example, custom object attributes for an object), including custom metadata (e.g., custom XML data), to be injected or embedded by or with an object (e.g., a controller component, a tag, a member, an AOI, a program, a routine, a ladder rung in a program, etc.), by object, into a desired project file (e.g., 108, 110, and/or 112) or (e.g., optionally) in the controller component 114 (e.g., an offline controller(s), or a running or online controller(s)) associated with the project file (e.g., in a copy of the project file stored in the data store 116 of the controller component 114). For instance, the design management component 102 can facilitate enabling respective custom data to be associated with (e.g., linked to, integrated with, embedded with, classified with or as being associated with, etc.) respective objects. Custom data can be data that can be meaningful to the authorized entity (e.g., the one who is producing the custom data) or to another authorized entity with respect to the object with which the custom data is embedded, and/or can provide context with respect to the object to the authorized entity or the other authorized entity, and/or can be based at least in part on an entity preference of the authorized entity. The custom data typically can be data that is not executed or interpreted by the controller component 114 when the custom data is loaded into the controller component 114. For instance, the design management component 102 or controller component 114 can quarantine the custom data to facilitate keeping the custom data associated with an object or project file from being executed or interpreted by the design management component 102 and/or controller component 114 from executing or interpreting the custom data to facilitate securing the design management component 102, the controller component 114, or an object(s) or a project file(s) associated therewith from engaging in a malicious attack on the design management component 102 and/or controller component 114.

The design management component 102 can provide mechanisms (e.g., scalable mechanisms), comprising components, applications, applets, tools, interfaces, etc., that can be utilized by authorized entities (e.g., who are using the data management component 118 to access the design management component 102) to facilitate associating (e.g., embedding, integrating, attaching, etc.) respective data (e.g., custom data) with (e.g., or to) respective objects, generating (e.g., creating, modifying) or managing project files, creating or editing objects, modifying values associated with objects (e.g., modify an AOI tag value to another desired AOI tag value, modify another type of parameter value to another desired parameter value), or performing other desired functions or operations. The custom data can comprise virtually any desired information that can be useful to an authorized entity or a business, wherein the data can comprise, for example, information relating to library management, an object name or name transformation associated therewith, a group that an object is associated with, a set of parameters associated with an object, comments regarding an object that can provide context regarding the object (e.g., context of the object or associated function(s) in relation to a project, a controller component, or an industrial automation system), information relating to instantiation or bulk instantiation of an object, information relating to version management (e.g., information relating or indicating a version of the object or changes made to the object or problems resolved in the version of the object), information indicating whether an object has been virtualized, emulated, or tested and/or information relating to virtualization, emulation, or testing of the object, information relating to problems or concerns with an object, event-related information associated with an object, progress information relating to design of an object or associated objects, reminder information related to an object to facilitate reminding an entity to take some action with regard to the object, alarm or alert information relating to an object, a help menu or troubleshooting menu with respect to an object or associated design project or industrial automation system, information that can facilitate (e.g., enabling) exchange of data between applications, and/or other desired information.

For example, the custom data can comprise an electronic document comprising help information relating to an object or associated project file, and the design management component can associate (e.g., embed, link, attach, etc.) the electronic document or information contained therein with the object in a desired format (e.g., as custom data in an XML format or other desired markup language format). An entity (e.g., an authorized entity) can access and view the information associated with the electronic document in connection with accessing the associated object via the project file stored in the design management component 102 within the design platform 104 or the controller component 114, without the entity having to separately accessing the electronic document and information contained therein via another component external to the design platform 104 or controller component 114. In contrast, conventional systems typically can have information relating to or describing aspects relating to an object in a separate document that is maintained external to conventional design platforms, wherein a user may have to reference the separate document in a mechanism that is external to a conventional design platform.

For instance, a first authorized entity can desire to inject, embed, or associate a first subset of custom data, which can be useful to the first authorized entity (and/or to an associated entity or business entity), in or with an object associated with a first project file (e.g., 108). The first authorized entity can use the data management component 118 to provide (e.g., communicate) the first subset of custom data to the design management component 102 to customize information associated with an object (e.g., decorate the object with the first subset of custom data) associated with a first project file (e.g., 108) by associating the first subset of custom data with the object. The design management component 102 can receive the first subset of custom data from the data management component 118. The design management component 102 (e.g., via the mechanism(s), tool(s), applet(s), etc.) can associate (e.g., link, attach, embed, etc.) the first subset of custom data with the object (e.g., in response to a request(s), instruction(s), or command(s) received from the first authorized entity) and can store the first subset of custom data and information associating the first subset of custom data with the object in the first project file (e.g., 108) in the data store 106 of the design management component 102 and/or the data store 116 of the controller component 114.

When the first authorized entity or another authorized entity (e.g., authenticated entity) accesses the object in the first project file (e.g., 108) via the design management component 102 or data management component 118, the first authorized entity or other authorized entity also can view the first subset of custom data in connection with accessing the object. For example, the first subset of custom data, or an icon or link to the first subset of custom data, can be associated with or in proximity to the object when the object is accessed by the first authorized entity via the design management component 102 or data management component 118, and the object, the first subset of custom data, and/or a link or an icon associated with the first subset of custom data can be presented (e.g., displayed) to the first authorized entity or other authorized entity via a user interface (UI) component associated with the design management component 102 or data management component 118. If a link or an icon is presented to the first authorized entity or other authorized entity with respect to the object, the first authorized entity or other authorized entity can select the link or icon via the design management component 102 or data management component 118 to access the first subset of custom data associated with (e.g., linked to) the link or icon.

Similarly, a second authorized entity can desire to inject, embed, or associate a second subset of custom data, which can be useful to the second authorized entity (and/or to an associated entity or business entity), in or with a second object associated with a second project file (e.g., 110). The second authorized entity can use a data management component 118 to provide (e.g., communicate) the second subset of custom data to the design management component 102 to customize information associated with the second object (e.g., decorate the second object with the second subset of custom data) associated with the second project file (e.g., 110) by associating the second subset of custom data with the second object. The design management component 102 can receive the second subset of custom data from the data management component 118. The design management component 102 can associate (e.g., link, attach, embed, etc.) the second subset of custom data with the second object (e.g., in response to a request(s), instruction(s), or command(s)) received from the second authorized entity) and can store the second subset of custom data and information associating the second subset of custom data with the second object in the second project file (e.g., 110) in the data store 106 of the design management component 102 and/or the data store 116 of the controller component 114.

When the second authorized entity or another authorized entity (e.g., authenticated entity) accesses the second object in the project file (e.g., 110) via the design management component 102 or data management component 118, the second authorized entity or other authorized entity can view the second subset of custom data in connection with accessing the second object. For example, the second subset of custom data, or a second icon or second link to the second subset of custom data, can be associated with or in proximity to the second object when the object is accessed by the second authorized entity via the design management component 102 or data management component 118, and the second object, the second subset of custom data, and/or the second link or second icon associated with the second subset of custom data can be presented (e.g., displayed) to the second authorized entity or other authorized entity via, for example, a user interface (UI) component associated with the design management component 102 or data management component 118. If the second link or second icon is presented to the second authorized entity or other authorized entity with respect to the second object, the second authorized entity or other authorized entity can select the second link or second icon via the design management component 102 or data management component 118 to access the second subset of custom data associated with (e.g., linked to) the second link or second icon.

In accordance with various other aspects and implementations, the design management component 102 can facilitate embedding or associating custom data with an object in a project file 110 or a controller component 114 to facilitate quick and efficient recovery or instantiation of information or a component(s) (e.g., a software-based component), when desired. For example, an authorized entity can desire to store custom data (e.g., represented as XML data) representing a set of HMI graphics files that can be used on an HMI on a terminal (not shown) that can be associated with the controller component 114 and the industrial automation system, wherein the HMI graphics files can be employed to generate or render HMI graphics screens that can be displayed on the display screen of the HMI. The design management component 102 can receive the custom data representing the set of HMI graphics files from the authorized entity, e.g., via the data management component 118, and can associate or embed the custom data with an object (e.g., an object relating to an HMI) in the desired project file 110, in response to a request or command to associate or embed the custom data with the object that is received from the authorized entity, via the data management component 118. The design management component 102 also can communicate the project file, or at least the object with the associated or embedded custom data to the controller component 114.

The display screen HMI on the terminal can present (e.g., display) the set of graphics screens, as desired. If, for some reason, the terminal ceases to operate or malfunctions and loses the set of graphics screens, a different terminal (not shown) can be employed in connection with the industrial automation system, wherein the different terminal can be associated with the controller component 114 and industrial automation system. The different terminal or the controller component 114 (or the design management component 102), for example, using an application developed and generated using the design management component 102, can quickly and efficiently access, obtain, or extract the custom data from the object that is stored in the project file in the controller component 114 (or the design management component 102), and can load the custom data representing the set of HMI graphics files on the different terminal. For instance, the different terminal, using the application, can (e.g., automatically) access, obtain, or extract the custom data in response to the authorized entity using a mouse pointer or other interface associated with the HMI display screen on the different terminal to point to a graphical representation of the controller component 114 that can be displayed on the HMI display screen. The different terminal can generate or render all or a desired portion of the HMI graphic screens represented by the custom data and can present the HMI graphics screens on the display screen of the HMI of the different terminal, as desired.

The design management component 102 can manage the data (e.g., custom data, objects, other information) presented to an authorized entity in response to accessing an object or in connection with an object based at least in part on the authorized entity (e.g., a user's name, identification number, or authentication information, etc.), a role (e.g., supervisor, technician, maintenance person, programmer, $3^{rd}$-party provider (e.g., application developer), etc.) of the authorized entity in connection with the project or business, and/or another desired factor(s) or criterion (or criteria). For instance, a first authorized entity may only be authorized to view a first subset of custom data associated with an object and/or the first subset of custom data may be relevant to the first authorized entity (e.g., due to the first authorized entity's role in the project or business), while other data associated with the object may not be relevant to the first authorized entity or the first authorized entity may not be authorized to access such other data. In response to the first authorized entity accessing the object via the design management component 102 or data management component 118, or in connection with the object, the design management component 102 can manage the data presented to the first authorized entity to present the first subset of custom data associated with the object via a UI component, while not presenting and/or permitting access to other data associated with the object that is not relevant to the first authorized entity and/or for which the first authorized entity is not authorized to access or view. Similarly, with respect to a second authorized entity, in response to the second authorized entity accessing the object (or another object) via the design management component 102 or data management component 118, or in connection with the object (or other object), the design management component 102 can manage the data presented to the second authorized entity to present a second subset of custom data associated with the object (or other object) via a UI component, while not presenting and/or permitting access to other data associated with the object (or other object) that is not relevant to the second authorized entity and/or for which the second authorized entity is not authorized to access or view.

The design management component 102 also can manage the association of custom data with an object, the storing of custom data in relation to an object, and presentation of custom data with respect to an object down to a desired granularity with respect to an object or a project file (e.g., 108, 110, or 112), in accordance with a preference of an authorized entity or a defined management criterion. For example, a first subset of custom data can be relevant to a first object, such as a program, which is at a first granularity level (e.g., a program level) within the project, and a second subset of custom data can be relevant to a second object, such as a ladder rung within the program, wherein the ladder rung can be at a second (e.g., higher) granularity level (e.g., a ladder rung level) that can be a higher level of granularity than the first granularity level. The design management component 102 can receive content (e.g., executable code) from the first authorized entity to facilitate generating or modifying the first object. In connection with the design management component 102 generating or modifying the first object, the design management component 102 can manage the first subset of custom data to associate first subset of custom data with the first object (e.g., the program) at the first granularity level associated with the first object, store the first subset of custom data in the data store 106 (and/or data store 116) in relation to the first object, and present the first subset of custom data in connection with the first object at the first granularity level (e.g., the first subset of custom data, or associated link or icon, can be presented in proximity to the first object at the first granularity level of the first object (e.g., via the design management component 102, data management component 118, and/or UI component).

The design management component 102 also can receive content from the first authorized entity to facilitate generating or modifying the second object. In connection with the design management component 102 generating or modifying the second object, the design management component 102 can manage the second subset of custom data to associate second subset of custom data with the second object (e.g., the ladder rung) at the second granularity level associated with the second object, store the second subset of custom data in the data store 106 (and/or data store 116) in relation to the second object, and present the second subset of custom data in connection with the second object at the second granularity level (e.g., the second subset of custom data, or associated link or icon, can be presented in proximity to the second object at the second granularity level of the second object (e.g., via the design management component 102, data management component 118, and/or UI component).

In some implementations, the design management component 102 can allow authorized entities to use applications or applets to perform desired operations (e.g., tasks) on data and/or act as a plug-in to facilitate performing operations on data (e.g., associating custom data with an object). For example, an applet can be employed to format a set of data, such as custom data, validate the set of data, and/or embed or otherwise associate the set of data with an object. The design management component 102 also can provide one or more applications, mechanisms, tools, functions, interfaces, components, or applets that can facilitate enabling an authorized entity to develop and use applications or applets (e.g., other applications or applets) to perform desired operations on data and/or act as a plug-in to facilitate performing operations on data, as more fully disclosed herein. For example, the design management component 102 can facilitate enabling or allowing an authorized entity to use a data management component 118 to (e.g., via the design management component 102) develop an application or applet that can facilitate, and/or use an application or applet to facilitate, embedding or attaching custom data (e.g., custom object attributes) with or to an object, and storing the object and associated custom data (e.g., the data-integrated object) into a project file (e.g., 108) and/or the controller component 114.

In some implementations, the design management component 102 (e.g., via a security component) can control and secure access to respective project files, respective objects, respective data (e.g., custom data) associated with respective objects, etc., based at least in part on respective (e.g., unique) user identification (ID) information (e.g., user IDs) and/or respective entity authentication information (e.g., authentication credentials) that the design management component 102 can assign to respective entities based at least in part on the entity, a role (e.g., supervisor, technician, information security personnel, etc.) of the entity, a related entity with which an entity is associated (e.g., a business with which a user is employed or otherwise associated), etc. For instance, the design management component 102 can assign a first user ID or first authentication information to a first authorized entity and a second user ID or second authentication information to a second authorized entity that can be different from the first user ID or first authentication information. The design management component 102 (e.g., via its security component) can authenticate entities and control respective access of entities to data (e.g., data stored in a project file(s)) stored in the data store 106, based at least in part on respective access rights that the design management component 102 can grant to respective authorized entities based at least in part on the respective user IDs or authentication information of the respective authorized entities, as more fully disclosed herein.

The design management component 102 can facilitate enabling one or more different authorized entities (e.g., users, applications) to store respective data (e.g., custom data) in a project file in the data store 106, wherein the design management component 102 can secure and control access to the respective data in the project file such that respective authorized entities are able to access their data (e.g., respective files comprising respective object data and respectively associated custom data) in the project file, while keeping other entities (e.g., unauthorized entities) from accessing such data. For example, the design management component 102 can grant a first subset of access rights to a first subset of data (e.g., a first subset of custom data or first subset of objects) in a project file to a first authorized entity, based at least in part on a first user ID or first authentication information associated with the first authorized entity (e.g., and presented to the design management component 102 by the first authorized entity, for example, via the data management component 118). The design management component 102 also can grant a second subset of access rights to a second subset of data (e.g., a second subset of custom data or second subset of objects) in the project file to a second authorized entity, based at least in part on a second user ID or second authentication information associated with the second authorized entity (e.g., and presented to the design management component 102 by the second authorized entity, for example, via the data management component 118). The first authorized entity and second authorized entity can be respectively associated with different entities or characteristics (e.g., different groups within a business, different roles within a business, different businesses, etc.) or can be associated with a same entity or characteristic. In addition to securing respective data of respective authorized entities within a project file (e.g., to limit access to data to an entity that is authorized to access and view such data), the design management component 102, by controlling access of respective authorized entities to data within the project file, can enable respective authorized entities to view respective data (e.g., respective custom data associated with respective objects) that can be of meaning and use to the respective authorized entities.

In some implementations, the design platform 104 (e.g. the data store of the design platform 104) can be configured to comprise a public section and a private section. The design management component 102 can manage and control access to respective information (e.g., objects, custom data, etc.) in the public section (e.g., public partition) and private section (e.g., private partition) based at least in part on the respective access rights of authorized entities to the public section and/or private section. For instance, it can be useful for certain information associated with an object to be communicated to a subset of authorized entities via the public section associated with the design management component 102 (e.g., the data store 106). As an example, if a modification (e.g., edit, change, etc.) is made to an object in a project file, such modification to the object may invalidate custom data (e.g., custom object attributes) associated with the object. In an instance where the design management component 102 determines that a modification to an object invalidates custom data associated with the object, the design management component 102 can communicate information (e.g., warning information or invalidation alert), which can indicate that such modification to the object invalidates the custom data associated with the object, to the private section of the design platform 104, wherein a subset of authorized entities can have access (e.g., based on a subset of access rights) to the private section and such information, and to the public section of the design platform 104, wherein another subset of authorized entities can have access (e.g., based on another subset of access rights) to the public section and such information. For example, in response to a modification made to an object by a first authorized entity that invalidates the custom data associated with the object, the design management component 102 can communicate warning information or an invalidation alert to a second authorized entity via the public section to which the second authorized entity has access rights and an ability to view (and/or an ability to receive a notification relating to the warning information or invalidation alert), and/or can communicate the warning information or invalidation alert to the first authorized entity via the private section (and/or public section) to which the first authorized entity has access rights and an ability to view (and/or an ability to receive the notification relating to the warning information or invalidation alert).

One advantage of a number of advantages of the disclosed subject matter is that since data (e.g., custom data) respectively associated with objects can be stored within the design platform 104 in a project file (e.g., 108, 110, or 112) or controller component 114, via the design management component 102, the respective data can persist with respect to the respective objects. This can facilitate enabling it to be significantly easier for an entity (e.g., an authorized entity) to keep track and correlate modifications (e.g., changes, adjustments, etc.) that are made to a project file, comprising keeping track and correlating the respective custom data associated with respective objects, including keeping track and correlating respective modifications to custom data in connection with respective modifications to respectively associated objects of a project file, as compared to how modifications to objects and data are tracked in conventional systems, which typically utilize external mechanisms, which are external to a conventional design platform, to track changes to project files. Thus, the disclosed subject matter does not require a separate mechanism, which is external to the design platform and design management component, to track and correlate modifications (e.g., data modifications) to a project file, including modifications to an object and/or custom data associated therewith, externally from the design platform (including the design management component), and re-apply such modifications back to the project file within the design platform, as the tracking and correlation of data can be desirably performed within the design platform. The disclosed subject matter also can facilitate efficient project design, including efficient design, configuration, and programming of controller components associated with an industrial automation system, reduction of time in designing, modifying, and/or maintaining a project, reduction in down time (e.g., offline time) of a controller component or associated industrial automation system, the maintaining of synchronization between respective objects and respective data (e.g., respective custom data), etc., since an entity (e.g., a user) does not have to engage in a rigorous or tedious process of reviewing, reconciling, and/or synchronizing data maintained external to the design platform 104 and other data (e.g., object data) maintained within the design platform 104 to determine if data external to the design platform 104 is still valid in relation to a current version of an object or if the object is no longer valid due to changes made to data external to the design platform 104, etc.

Figure 2:
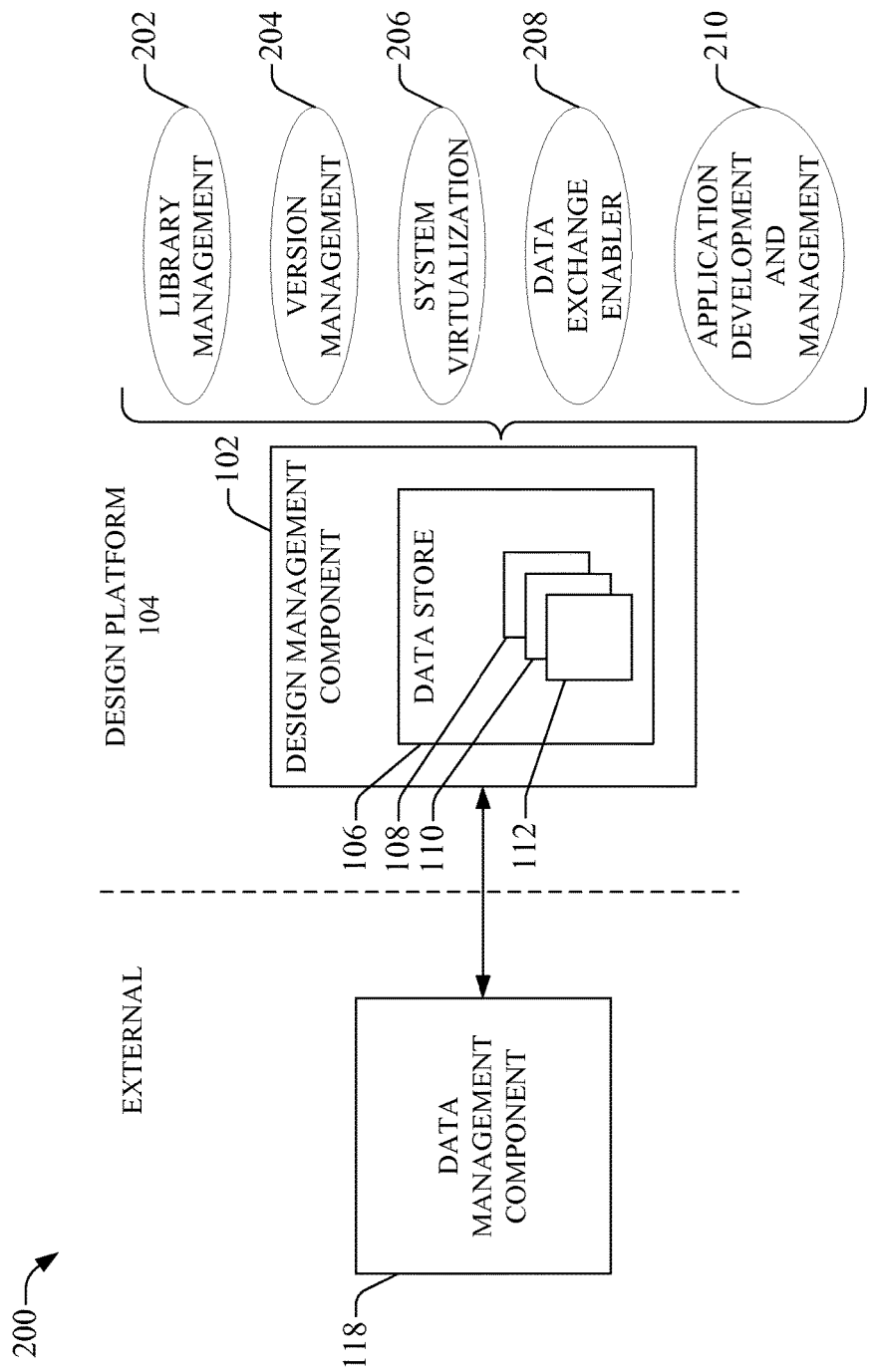
FIG. 2 depicts a diagram of an example system that can facilitate designing, configuring, and programming controllers, other devices, and/or components, and to manage information associated with designing, configuring, and programming controllers, other devices, and/or components, in connection with industrial automation systems, in accordance with various aspects and embodiments.

Referring to FIG. 2 (along with FIG. 1), FIG. 2 depicts a diagram of an example system 200 that can facilitate designing, configuring, and programming controllers, other devices, and/or components, and to manage information associated with designing, configuring, and programming controllers, other devices, and/or components, in connection with industrial automation systems, in accordance with various aspects and embodiments. The system 200 can comprise a design management component 102 that can reside within or be associated with a design platform 104 that can be employed to facilitate designing, configuring, and programming controllers, other devices, and/or components, and to manage information associated with designing, configuring, and programming controllers, other devices, and/or components, in connection with industrial automation systems. The design management component 102 can comprise a data store 106 that can store a desired number of project files that can be respectively associated with respective entities (e.g., authorized users, applications), respective projects, and/or respective controller components, wherein respective subsets of information can be stored in the respective project files (e.g., 108, 110, 112) in the data store 106. The design management component 102 also can be associated with (e.g., communicatively connected to) the data management component 118 that can, for example, reside external to the design platform 104.

The design management component 102 can operate in conjunction with the data management component 118 to enable respective authorized entities to view, add, edit, or delete their respective data (e.g., respective custom data) on or from objects (e.g., by object) associated with a project file (e.g., 108, 110, and/or 112) or a controller component (e.g., 114) in accordance with their respective rules. The design management component 102 can facilitate managing and storing information, including respective custom data of respective authorized entities, relating to a project, controller component, or industrial automation system within respective project files (e.g., 108, 110, and/or 112) of respective authorized entities in the data store 106 (or in the data store 116 of a controller component 114).

Figure 3:
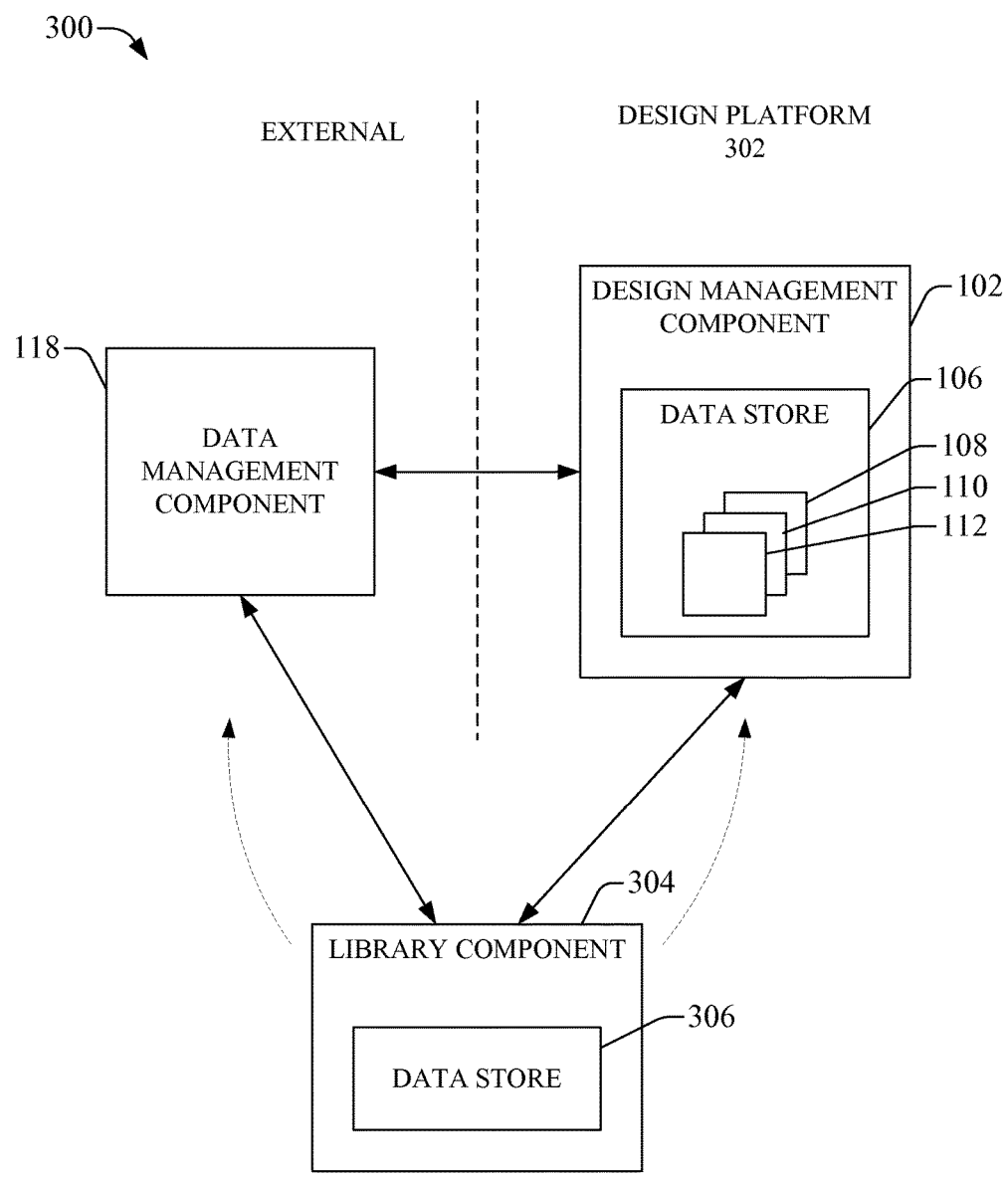
FIG. 3 illustrates a block diagram of an example system that can perform desired library management to facilitate managing information associated with designing, configuring, and programming controllers, other devices, and/or components, in connection with industrial automation systems, in accordance with various aspects and embodiments of the disclosed subject matter.

In some implementations, the design management component 102 can facilitate desired library management 202 to manage information contained in a library(ies). Referring briefly to FIG. 3 (along with FIGS. 1 and 2), FIG. 3 illustrates a block diagram of an example system 300 that can perform desired library management to facilitate managing information associated with designing, configuring, and programming controllers, other devices, and/or components, in connection with industrial automation systems, in accordance with various aspects and embodiments of the disclosed subject matter. The system 300 can comprise the design management component 102, which can reside within or be associated with a design platform 302. The design management component 102 can comprise the data store 106, and can be associated with (e.g., communicatively connected to) the data management component 118 that can, for example, reside external to the design platform 302.

The system 300 can comprise a library component 304 that can reside external to the design platform 302 or within the design platform 302. The library component 304 can be associated with (e.g., communicatively connected to) the data management component 118 and/or the design management component 102, in accordance with various aspects and implementations of the disclosed subject matter. The library component 304 can be employed to manage and store (e.g., in a data store 306) information (e.g., including custom data of authorized entities relating to a project file), documents (e.g., of various types and formats), dynamic linked library (DLL) files, applications, applets, metadata, etc., that can relate to, for example, a design project comprising information comprising the designing, configuring, and programming of controllers, other devices, and/or components of an industrial automation system.

The design management component 102 can facilitate managing and storing respective data (e.g., custom data of authorized entities and/or other data) associated with respective objects and/or other information (e.g., in the data store 106), and synchronizing respective data (e.g., custom data and/or other data) associated with respective objects and/or other information between the design management component 102 and another component(s) (e.g., library component 304, data management component 118, controller component 114, etc.). As part of library management 202, the design management component 102 can facilitate setting and storing (e.g., in data store 106) parameters associated with objects, setting and storing naming transformations associated with objects, grouping of objects, generating, identifying, or associating version information relating to objects, instantiating or bulk instantiating objects, re-use of objects or other components or information based at least in part on information (e.g., objects or other information) stored in a library associated with the design management component 102 or another component(s) (e.g., library component 304, data management component 118, controller component 114, etc.), etc., based at least in part on information (e.g., custom data) received from authorized entities (e.g., via the data management component 118).

At desired times, or in response to a command or an event (e.g., a synchronization triggering event), the design management component 102 can synchronize such information (e.g., object information, custom data, parameter settings, naming transformations, object grouping information, object version information, object instantiation-related information, etc.) between the design management component 102 and another component(s) (e.g., library component 304, data management component 118, controller component 114, etc.). The design management component 102 also can enable easier and more efficient management for bulk generation tools or components. For instance, a project file can be downloaded (e.g., using the design management component 102) to the controller component 114 without including custom data (e.g., the custom object attributes) associated with an object(s) because the custom data has not been drafted or embedded with the object(s) yet, has not been tested yet, or for another desired reason. There can be an offline version of the project file (e.g., a version of the project file not loaded onto the controller component 114) that can comprise custom data associated with an object(s) (e.g., previous custom data that was not included in the downloading of the project file to the controller component 114 and/or custom data that was generated and associated with the object(s) subsequent to the downloading of the project file to the controller component 114). When the design management component 102 performs an uploading of the project file (which does not have the custom data associated with the object(s)) from the controller component 114 to the design management component 102, a synchronization can be triggered, wherein the design management component 102 can perform (e.g., automatically, dynamically) data synchronization between the offline version of the project file and the version of the project file being uploaded from the controller component 114 to the design management component 102 to update the version of the project file being uploaded to include the custom data associated with the object(s) (e.g., the custom data can be embedded or merged with the object(s) in the version of the project file being uploaded).

As an example of bulk instantiation of an object, an authorized entity may want to be able to perform a bulk instantiation (e.g., a desired number (e.g., 10, 100, 1000, or other number) of instances) of a particular object (e.g., a controller that can control a motor) in connection with a project file associated with an industrial automation system. In connection with the project, there can be a number of issues that may need to be addressed in order to do a bulk instantiation of the particular object, for example, with respect to the project or in general. The authorized entity can determine or generate custom data that can address and/or resolve any issues (e.g., how is the bulk instantiation to be performed, where should the bulk instantiation be placed in the controller, etc.), and/or can highlight an issue(s) (e.g., an outstanding issue), relating to the bulk instantiation of the particular object. The design management component 102 can receive the custom data relating to the bulk instantiation from the authorized entity, for example, via the data management component 118 or library component 304, and also can receive information (e.g., a command, an instruction, a request, etc.) that can indicate the authorized entity desires to associate (e.g., embed, integrate, link, or attach, etc.) the custom data relating to the bulk instantiation with the particular object in the project file. In response, the design management component 102 can associate the custom data with the particular object in the project file and can store the object and associated custom data (e.g., the data-integrated object) in the project file in the data store 106 to facilitate enabling the authorized entity or another authorized entity to access and view the custom data (e.g., directly or via a link to the custom data associated with or in proximity to the particular object), for example, when the authorized entity or other authorized entity accesses the particular object (e.g., the data-integrated object) in the project file stored in the data store 106 of the design management component 102.

Having this custom data (e.g., custom object attributes) associated with the particular object can enable the custom data to persist with respect to the object and project file, and can enable the authorized entity or the other authorized entity to more efficiently perform a bulk instantiation of the particular object. Also, if an authorized entity desires to modify the custom data associated with the particular object, the authorized entity, via the design management component 102, can access the custom data associated with the particular object to modify the custom data without having to engage in a tedious process of modifying an object in a project file, exporting information relating to the object modification to an external component (e.g., external library) that is external to the design platform, modifying custom data and/or information relating to the modified object by the external component to convert the custom data or modified object information into a form that is usable by the external component, de-registering the object or exporting the object as modified, and/or re-registering the modified object with the design platform.

In contrast, some conventional systems are not able to allow custom object attributes to persist in a project and typically have data, such as custom object attributes, for an object reside external to conventional design platforms. Also, with such conventional systems, a user typically has to engage in a tedious and inefficient process of modifying an object in a project file, exporting information relating to the object modification to an external component (e.g., external library) that is external to the conventional design platform, modifying custom data and/or information relating to the modified object by the external component to convert the custom data or modified object information into a form that is usable by the external component, de-registering the object or exporting the object as modified, and/or re-registering the modified object with the conventional design platform. Further, to perform a bulk instantiation, some conventional systems have a user employ a manually intensive process whereby the user may have to repeatedly copy and paste an instantiation of an object over and over until the desired number of object instantiations are achieved.

With further regard to FIGS. 1 and 2, the design management component 102 also can facilitate desired version management 204 to facilitate managing, maintaining, tracking, modifying, identifying, and/or determining a version of an object or a version of information associated with an object. To facilitate desired version management 204, the design management component 102 can manage versions of objects, or versions of information (e.g., custom data of users) associated with objects, to a finer level of granularity. For example, the design management component 102 can manage versions of objects, or information associated with objects, to a sub-program level, wherein the design management component 102 can manage, maintain, track, modify, identify, and/or determine a version of an object (e.g., a routine) at the routine level, an object (e.g., a ladder rung) at the ladder rung level, or an object at another desired level of granularity.

Figure 4:
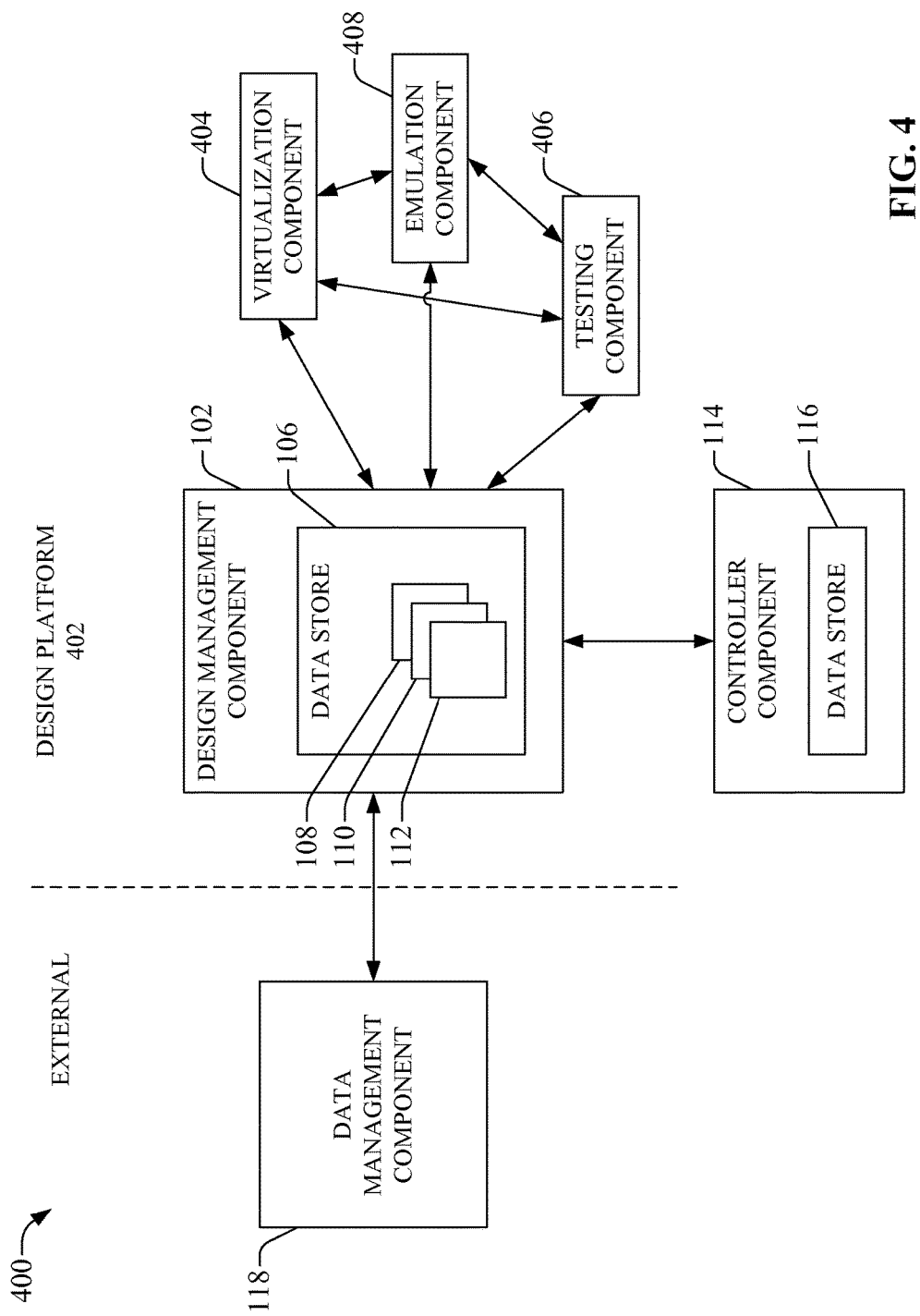
FIG. 4 presents a block diagram of an example system that can perform system virtualization, emulation, and testing in connection with industrial automation systems, in accordance with various aspects and embodiments of the disclosed subject matter.

The design management component 102 and the design platform also can facilitate desired system virtualization 206 for virtualization of a system for emulation and testing. Referring briefly to FIG. 4 (along with FIGS. 1 and 2), FIG. 4 presents a block diagram of an example system 400 that can perform system virtualization, emulation, and testing in connection with industrial automation systems, in accordance with various aspects and embodiments of the disclosed subject matter. The system 400 can comprise the design management component 102, which can reside within or be associated with a design platform 402. The design management component 102 can comprise the data store 106, and can be associated with (e.g., communicatively connected to) the data management component 118 that can, for example, reside external to the design platform 402.

The system 400 can comprise a virtualization component 404 that can be associated with the design management component 102. To facilitate virtualization of a system (e.g., an industrial automation system, or portion thereof), the virtualization component 404 can access and/or receive information, including custom data associated with objects (e.g., as injected into objects by an authorized entity(ies)), from the design management component 102. The virtualization component 404 can generate a virtualization (e.g., a virtualization model or object) of a system (e.g., an industrial automation system, or portion thereof), a controller component 114, or another device or component, based at least in part on the custom data received from authorized entities, wherein respective custom data can be associated with respective objects in a project file (e.g., 108), which can comprise information representing the design, configuration, and programming of a controller component 114 and/or other objects associated with an industrial automation system. For instance, based at least in part on information contained in a project file relating to an industrial automation system, the virtualization component 404 can virtualize objects (e.g., controllers of the controller component 114, tags, members, AOIs, programs, routines in a program, ladder rungs in a program, or other components), industrial devices, industrial processes, industrial assets, a network component (e.g., comprising a set of network-related devices), etc., associated with an industrial automation system, and the architecture, arrangement, and/or associations (e.g., connections, logic, etc.) of the respective objects, industrial devices, industrial processes, industrial assets, network component, etc., in relation to each other with respect to the industrial automation system.

The system 400 also can comprise a testing component 406 and an emulation component 408 that each can be associated with the design management component 102 and the virtualization component 404. The testing component 406 can utilize the custom data associated (e.g., embedded) with an object(s), the virtualization of the industrial automation system, or portion thereof, (e.g., the virtualization model or object), and/or other information (e.g., obtained from the design management component 102, controller component 114, or emulation component 408) to facilitate testing or simulating objects, devices, processes, assets, or components associated with the industrial automation system to facilitate ensuring desired (e.g., optimal, proper, acceptable, etc.) operation of the objects, devices, processes, assets, or components (e.g., before implementing such objects, devices, processes, assets, or components in the industrial automation system). For example, the testing component 406 can utilize custom data associated with an object to facilitate testing or simulating the object and/or another object(s), a system (e.g., sub-system), a device, a process, etc. As another example, the testing component 406 also can simulate and/or test the custom data associated with an object to determine whether the custom data is suitable (e.g., acceptable, optimal, useful) and/or to determine the effects the custom data will have if utilized. In other implementations, the testing component 406 can be employed to facilitate generating testing information comprising a test(s) or a testing algorithm(s), that can be embedded as custom data (e.g., other custom data) with an object, wherein the test or testing algorithm can be used to facilitate performing testing in connection with the object.

The emulation component 408 can utilize the custom data associated (e.g., embedded) with an object(s), the virtualization of the industrial automation system, or portion thereof, (e.g., the virtualization model or object), and/or other information (e.g., obtained from the design management component 102, controller component 114, or testing component 406) to facilitate emulating objects, devices, processes, assets, or components associated with the industrial automation system, wherein the emulated objects, devices, processes, assets, or components can be employed for a variety of purposes (e.g., an emulated object can be used in industrial automation system to replicate the functionality of, and replace, the object being emulated, emulated objects can be used in system testing or system training, etc.).

With further regard to FIGS. 1 and 2, the design management component 102 also can facilitate desired data exchange between applications 208 (and/or tools), such as design and/or engineering applications (e.g., $3^{rd}$ party design applications or tools), control applications, programming applications, applets, and/or other types of applications. For instance, the design management component 102 can facilitate or enable data (e.g., custom data associated with an object or other data associated with a project file) to be communicated or exchanged between a first application and a second application, wherein the design management component 102 can re-format, modify, synthesize, or aggregate, etc., data to enable data to be exchanged between the first application and second application, so that the respective data can be in a form that can be used by the first application and/or second application. For instance, the design management component 102 can enable custom data to be embedded or otherwise associated with an object using a first application. The custom data can comprise information that can facilitate creating a project comprising the object or another project, information that can provide instructions or recommendations regarding how to interact with, use, display, or perform tasks with respect to the object, or other information that can be meaningful or useful to an entity (e.g., authorized entity) with respect to the object or associated project. The design management component 102 also can facilitate enabling the custom data associated with the object to be exchanged with, accessed by, or used by a second application that is authorized to access the custom data and associated object, wherein the custom data can be in a format that can be usable by the second application. An authorized entity can use the second application to access the custom data to, for example, facilitate creating or modifying a project, or learning how to interact with, use, display, or perform tasks with respect to the object.

Figure 5:
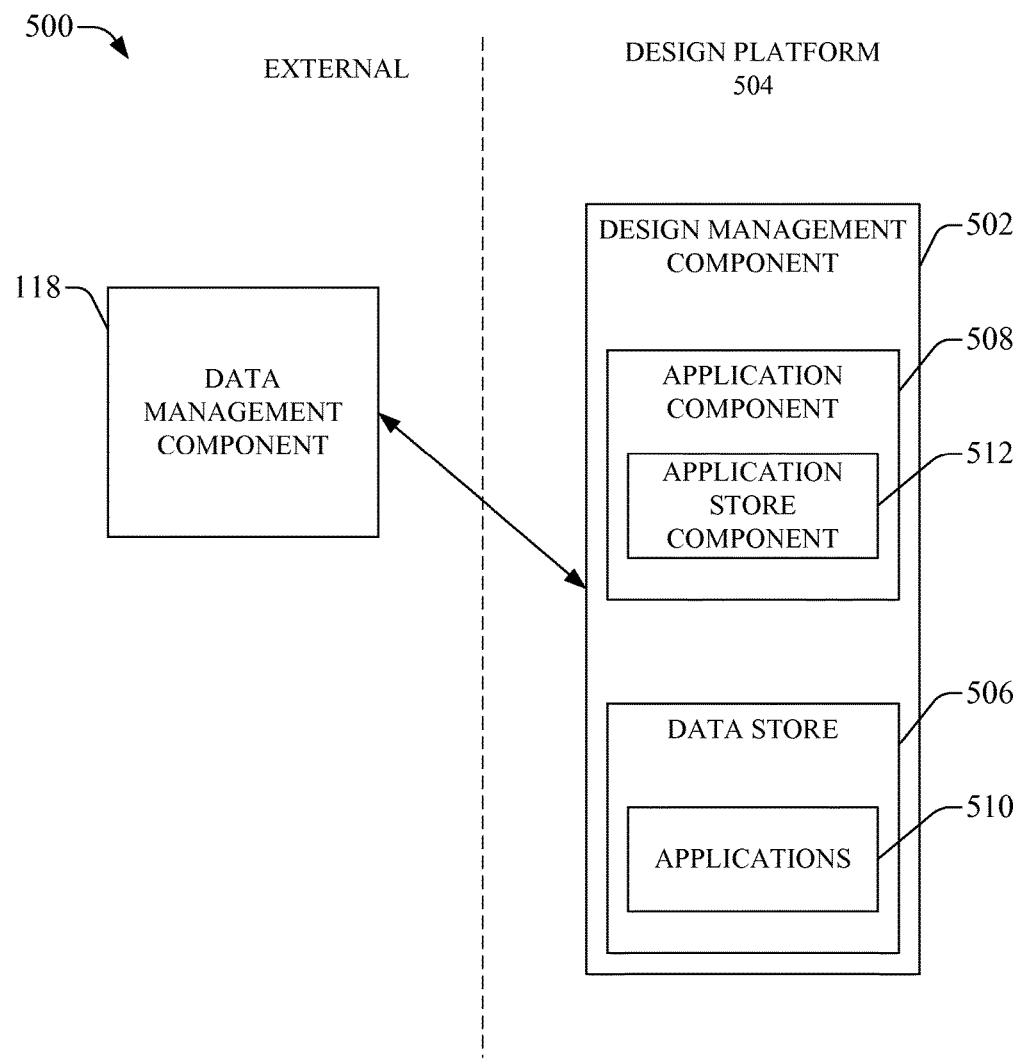
FIG. 5 depicts a block diagram of an example system that can facilitate application development and management, in accordance with various aspects and embodiments of the disclosed subject matter.

The design management component 102 and the design platform also can facilitate desired application development and management 210 in relation to objects, controllers, devices, or components, to facilitate designing, configuring, and programming of controllers or other devices or components with respect to industrial automation systems. Turning briefly to FIG. 5 (along with FIGS. 1 and 2), FIG. 5 depicts a block diagram of an example system 500 that can facilitate application development and management, in accordance with various aspects and embodiments of the disclosed subject matter. The system 500 can comprise the design management component 502, which can reside within or be associated with a design platform 504. The design management component 502 can comprise the data store 506, and can be associated with (e.g., communicatively connected to) the data management component 118 that can, for example, reside external to the design platform 504.

The design management component 502 can comprise an application component 508 that can provide mechanisms, tools, functions, interfaces, components, applets, etc., that can be used to enable authorized entities to develop and manage applications 510 (e.g., applications, applets, etc.), which can be stored in the data store 506. The applications 510 can be used, for example, to process information (e.g., custom data relating to objects), perform functions or operations on data, facilitate the designing, configuring, and programming of controllers or other devices, and/or provide other desired functions or perform other desired operations on data. For instance, respective authorized entities can access and use the application component 508 to develop and manage respective applications 510 that can be structured and tailored to suit the desires and needs of the respective authorized entities (and respectively associated businesses) in connection with designing, configuring, and programming controllers or other devices associated with respective industrial automation systems. An application 510 generated or created using the application component 508 can be designed to specifically work with the devices (e.g., industrial-related devices, HMIs, drives, motor controls, etc.), controllers, software, and components associated with the design platform 504 and/or can be designed to work with other platforms or operating systems. The application component 508 can generate respective file folders that can be used to store the respective applications 510, or respective information relating thereto, of respective authorized entities, wherein the respective file folders and respective applications 510 therein can be stored in the data store 506.

The application component 508 can comprise an application store component 512 that can facilitate, for example, displaying information relating to applications 510 (e.g., information indicating the titles, descriptions, and features of applications 510, the cost to purchase an application 510 (e.g., if the application is not available for free), etc.), communicating (e.g., downloading) application data (e.g., application software data) relating to applications 510, or receiving information from a user via the data management component 118 or other component (e.g., library component) in connection with the development or management of an application 510 by the authorized entity, etc.

As an example of application development, an authorized entity associated with one industry (e.g., brewing industry) may have a certain set of desires, objectives, or needs with respect to designing, configuring, or programming of controllers or other devices with respect to the design and control of an industrial automation system. The authorized entity can access the application component 508 and can use the tools, functions, interfaces, components, applets, etc., of the application component 508 to develop an application 510 that can perform functions or contain features that can satisfy the set of desires, objectives, or needs of the authorized entity. The application 510 can be stored in a file folder associated with the authorized entity that can be stored in the data store 506, and the application component 508 can make the application 510 available to the authorized entity or other authorized entities (as desired by the authorized entity) via the application store component 512. For instance, other authorized entities associated with the same industry (e.g., the brewing industry) or an analogous or similar industry can be interested in using the application 510 created by the authorized entity. If permitted by the authorized entity (e.g., based on permission or access rights information associated with the application 510, as specified by the authorized entity), one or more of those other authorized entities can view information relating to the application 510 via the application store component 512. If another authorized entity finds the application suitable for use by the authorized entity, the authorized entity can access the application 510 via the application component 508, and can use the application 510 (via the design management component 502) or download the application 510 for use (e.g., if permitted by the authorized entity, based on permission or access rights information associated with the application 510).

Similarly, a different authorized entity associated with a different industry can have a different set of desires, objectives, or needs with respect to designing, configuring, or programming of controllers or other devices with respect to the design and control of a different industrial automation system. The different authorized entity can access the application component 508 and can use the tools, functions, interfaces, components, applets, etc., of the application component 508 to develop a different application 510 that can perform functions or contain features that can satisfy the different set of desires, objectives, or needs of the different authorized entity.

Referring briefly to FIG. 6 (along with FIG. 1), FIG. 6 presents an image of example custom metadata syntax 600 that can be employed by the design management component 102, in accordance with various aspects and embodiments of the disclosed subject matter. The example custom metadata syntax 600 comprises an example XML schema that can illustrate various functions and features of the disclosed subject matter. A custom metadata syntax, such as the custom metadata syntax 600, can comprise various pieces of information, such as, for example, information (e.g., custom data or other information) relating to controllers, tags, user-defined data types (UDTs), AOIs, I/O modules, containers, tasks, programs, routines, ladders, ladder rungs, instructions, function block diagrams (FBDs), sequential function charts (SFCs), motion, clocks, time synchronization, coordinated system time, trends, and/or other objects or components.

As shown in FIG. 6, the custom metadata syntax 600 comprises information (e.g., metadata or other data) that can facilitate providing various functionalities of the disclosed subject matter. For example, the custom metadata syntax 600 illustrates that the disclosed subject matter (e.g., via the design management component 102) can provide support for multiple providers (e.g., <Provider ID="TPTool">, <Provider ID="GEMS">, <Provider ID="OtherProvider">). As another example, the custom metadata syntax 600 illustrates that the disclosed subject matter (e.g., via the design management component 102) can provide captions that can be supplied by respective authorized entities (e.g., users, such as providers), wherein a caption (e.g., <Caption>) can allow or enable an authorized entity to communicate additional information (e.g., <Caption><![CDDATA[This is part of a modular object]]></Caption>, or other custom additional information) for an object of the design platform 104. As yet another example, the custom metadata syntax 600 illustrates that the disclosed subject matter (e.g., via the design management component 102) can provide edit warning messages and can further provide for multiple language support and language switching for edit warning messages, wherein, if an object is edited via the design platform 104 (e.g., using the design management component 102), the design management component 102 can facilitate communicating an entity-supplied warning message to entities (e.g., other authorized entities) before the entities can proceed with the edit, and wherein the edit warning message can be in a language (e.g., English, Chinese, Greek, Korean, etc.) desired by the authorized entity who created the edit warning message or by an authorized entity who has selected a desired language to use (e.g., via the design management component 102).

Figure 7:
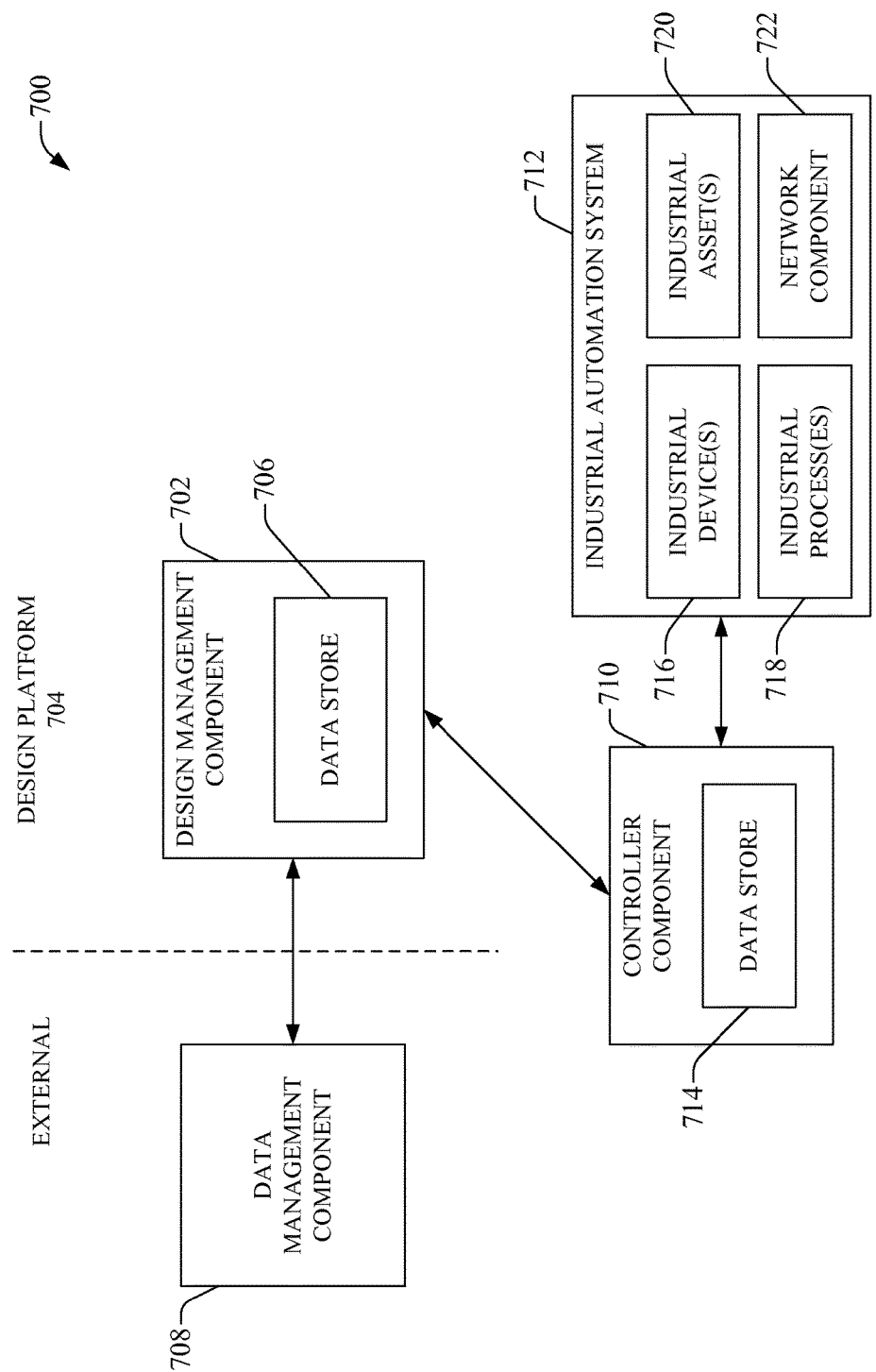
FIG. 7 depicts a block diagram of an example system that can facilitate designing, configuring, and programming controllers, other devices, and/or components, and in connection with managing information associated with designing, configuring, and programming controllers, other devices, and/or components, with respect to industrial automation systems, in accordance with various aspects and embodiments of the disclosed subject matter.

FIG. 7 depicts a block diagram of an example system 700 that can facilitate designing, configuring, and programming controllers, other devices, and/or components, and in connection with managing information associated with designing, configuring, and programming controllers, other devices, and/or components, with respect to industrial automation systems, in accordance with various aspects and embodiments of the disclosed subject matter. The system 700 can comprise the design management component 702, which can reside within or be associated with a design platform 704. The design management component 702 can comprise the data store 706, and can be associated with (e.g., communicatively connected to) a data management component 708 that can, for example, reside external to the design platform 704.

The system 700 also can comprise a controller component 710 that can be associated with the design management component 702 and the design platform 704. The controller component 710 can comprise one or more controllers that can be designed, configured, or programmed to perform various functions and control respective devices, processes, assets, or components of an industrial automation system 712. The controller component 710 also can comprise a data store 714 that can store information (e.g., project files comprising information, including custom data relating to objects, design-related information, configuration-related information, programming-related information, or other information).

The controller component 710 can be associated with the industrial automation system 712 to facilitate controlling operation of the industrial automation system 712. The industrial automation system 712 can comprise one or more industrial devices 716, one or more industrial processes 718, and one or more industrial assets 720, that can be distributed throughout an industrial facility(ies) in accordance with a desired industrial-automation-system configuration. The industrial automation system 712 can perform industrial processes or other actions to facilitate producing desired products, processed materials, etc., as an output.

The industrial automation system 712 also can include a network component 722 that can comprise network-related devices (e.g., communication devices, routers (e.g., wireline or wireless routers), switches, etc.), wherein respective network-related devices can be connected to or interfaced with certain other network-related devices to form a communication network having a desired communication network configuration. One or more network-related devices of the network component 722 can be associated with (e.g., integrated with, interfaced with, and/or communicatively connected to) the various industrial devices 716, industrial processes 718, and/or other industrial assets 720 of the industrial automation system 712 to facilitate communication of information (e.g., command or control information or signals, parameter data, configuration data, status information, production information, etc.) between the various industrial devices 716, industrial processes 718, and/or other industrial assets 720 via the network component 722. The network component 722 also can be associated with (e.g., interfaced with and/or communicatively connected to) the controller component 710 to facilitate communication of data between the industrial automation system 712 and the controller component 710.

Figure 8:
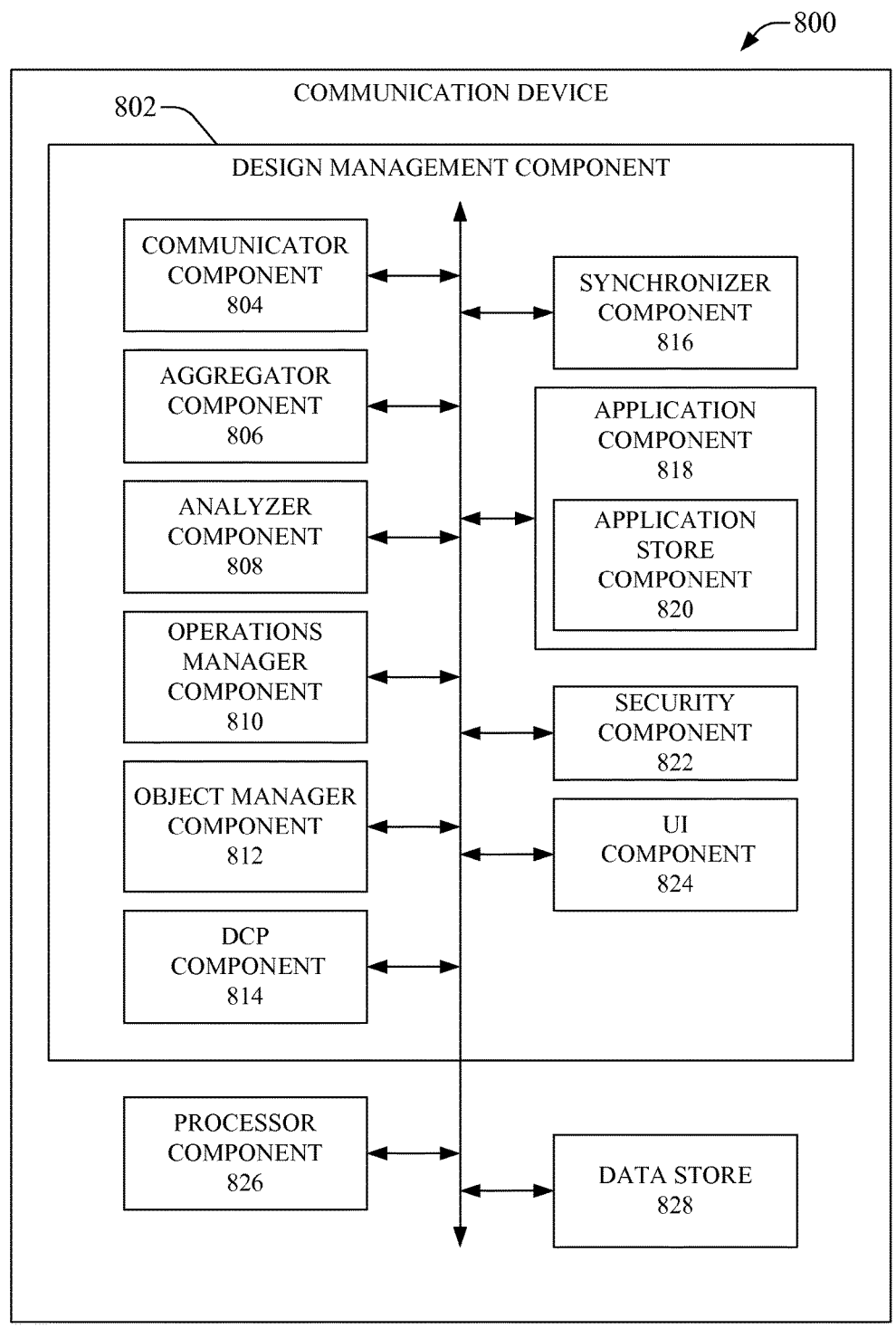
FIG. 8 depicts a block diagram of an example communication device that can employ a design management component that can provide various mechanisms, functionalities, and features, and can perform various operations or functions, in accordance with various aspects and implementations of the disclosed subject matter.

FIG. 8 depicts a block diagram of an example communication device 800 that can employ a design management component that can provide various mechanisms, functionalities, and features, and can perform various operations or functions, in accordance with various aspects and implementations of the disclosed subject matter. The communication device 800 can comprise a design management component 802 that can facilitate designing, configuring, and programming controllers, other devices, and/or components, and to manage information associated with designing, configuring, and programming controllers, other devices, and/or components, in connection with industrial automation systems, in accordance with various aspects and embodiments.

The design management component 802 can comprise a communicator component 804 that can transmit information to another component(s) or receive information from another component(s). For instance, the communicator component 804 can facilitate communication (e.g., transmission, receiving) of information between the communication device 800 and another component(s), such as a data management component, a library component, a controller component, etc., associated with (e.g., communicatively connected to the communication device. The communicator component 804 can communicate with the other component(s) via a wireline or wireless connection using virtually any desired type of wireline or wireless communication technology (e.g., broadband, Wi-Fi, WiMax, cellular, digital subscriber line (DSL)-type communication technology, T-1, T-3, optical carrier communication technology (e.g., synchronous optical networking (SONET)), etc.). The information can comprise information relating to industrial control systems, such as, for example, project files, objects, custom data associated with objects, logic information, design information, configuration information, programming information, application information, and/or other information that can relate to the design, configuration, and programming of controllers or other devices associated with industrial automation systems.

The design management component 802 also can comprise an aggregator component 806 that can aggregate data received (e.g., obtained) from various entities, components or devices (e.g., data management component(s), library component(s), controller component(s), UI or display component(s), processor component(s), user interface(s), data store(s), etc.). The aggregator component 806 can correlate respective items of data based at least in part on type of data, source of the data, time or date the data was generated or received, object with which data (e.g., custom data) is associated, project file with which the data is associated, industrial automation system with which the data is associated, entity or group of entities with which the data is associated, etc., to facilitate processing of the data (e.g., analyzing of the data by the analyzer component 808 or another component(s) of the communication device 800).

The design management component 802 can include an analyzer component 808 can analyze data to facilitate associating, embedding, or integrating data (e.g., custom data) with an object; generating, modifying, or managing a program file; designing, configuring, or programming a controller or other object in connection with controlling an industrial automation system; managing a library; managing version information associated with objects; virtualizing an industrial automation system; testing an industrial automation system, or portion thereof; emulating an industrial automation system, or portion thereof; developing or managing applications or applets; etc., based at least in part on the results of the data analysis. The analyzer component 808 can receive data from other components for analysis and can transmit data (e.g., raw data, synthesized data, analysis results, etc.) to other components (e.g., operations manager component 810, object manager component 812, design, configuration, and programming component 814, synchronization component 816, application component 818, application store component 820, UI component 822, security component 824, processor component 826, data store 828, etc.) for display, storing, or further processing.

The design management component 802 also can comprise an operations manager component 810 that can control or manage operations relating to associating, embedding, or integrating data (e.g., custom data) with an object; generating, modifying, or managing a program file; designing, configuring, or programming a controller or other object in connection with controlling an industrial automation system; managing a library; managing version information associated with objects; virtualizing an industrial automation system; testing an industrial automation system, or portion thereof; emulating an industrial automation system, or portion thereof; developing or managing applications or applets; etc. The operations manager component 810 can facilitate controlling operations being performed by various components of the design management component 802, controlling data flow between various components of the design management component 802, controlling data flow between the design management component 802 and other components of the communication device 800, etc.

The design management component 802 further can include an object manager component 812 that can facilitate generating, modifying, and managing objects (e.g., a controller, a tag, a member, AOI, a program, a routine in a program, a ladder rung in a program, etc.) associated with a project file in connection with industrial automation systems. For instance, for respective objects stored in a project file, the object manager component 812 can facilitate associating, embedding, integrating, or injecting desired data (e.g., custom data associated with users) with or into an object (e.g., on an object-by-object basis) to facilitate associating respective data, such as respective custom data, with respective objects in a useful and meaningful way for entities and to facilitate the persistence of such data in connection with the objects and project file. The object manager component 812 also can facilitate modifying data associated with an object, as desired.

The design management component 802 can comprise a design, configuration, and programming (DCP) component 814 that can provide tools, functions, interfaces, mechanisms, components, applications, applets, etc., that can be used by an authorized entity to facilitate enabling the authorized entity to design, configure, and/or program objects (e.g., a controller, tags, programs, etc.) relating to an industrial automation system, devices, components, or assets associated with an industrial automation system, etc., to facilitate designing and/or controlling an industrial automation system. The DCP component 814 can receive design-related information, configuration-related information, and/or programming-related information (e.g., via an interface(s) associated with the design management component 802, or a data management component or other component associated therewith), and can design, configure, and/or program an object or other component or device based at least in part on the design-related information, configuration-related information, and/or programming-related information.

The design management component 802 can include a synchronization component 816 that can synchronize information (e.g., objects, custom data, etc.) between the design management component 802 and another component(s) (e.g., a data management component, a library component, a controller component, etc.) to facilitate maintaining information synchronization, information integrity, information compatibility, operational compatibility, etc., in connection with designing, configuring, and programming controllers or other objects or devices, in connection with industrial automation systems. At desired times, or in response to a command or an event (e.g., a synchronization triggering event), the synchronization component 816 can synchronize information (e.g., object information, custom data, parameter settings, naming transformations, object grouping information, object version information, object instantiation-related information, etc.) between the design management component 802 and another component(s) (e.g., data management component, library component, controller component, etc.).

The design management component 802 also can comprise an application component 818 that can provide mechanisms, tools, functions, interfaces, components, applets, etc., that can be used to enable authorized entities to develop and manage applications (e.g., applications, applets, etc.) The applications can be used, for example, to process information (e.g., custom data relating to objects), perform functions or operations on data, facilitate the designing, configuring, and programming of controllers or other devices, and/or provide other desired functions or perform other desired operations on data. An authorized entity can access and use the application component 818, for example, to develop and manage one or more applications that can be structured and tailored to suit the desires and needs of the authorized entity in connection with designing, configuring, and programming controllers or other devices associated with an industrial automation system(s). For instance, an application generated or created using the application component 818 can be designed by an authorized entity to specifically work with the devices (e.g., industrial-related devices, HMIs, drives, motor controls, etc.), controllers, software, and components associated with a design platform and/or can be designed to work with other platforms or operating systems. The application component 818 can generate respective file folders (e.g., application folders) that can be used to store the respective applications, or respective information relating thereto, of respective authorized entities, wherein the respective file folders and respective applications therein can be stored in the data store 828.

The application component 818 can comprise an application store component 820 that can facilitate, for example, displaying information relating to applications (e.g., information indicating the titles, descriptions, and features of applications, the cost, if any, to purchase an application, etc.), communicating (e.g., downloading) application data (e.g., application software data) relating to applications, or receiving information from an authorized entity via the design management component 802 or other component in connection with the development or management of an application by the authorized entity, etc.

The communication device 800 also can comprise a UI component 822 that can receive information from a user (e.g., an authorized user) or present (e.g., display, broadcast, etc.) information to the user. The UI component 822 can comprise one or more UIs, such as a display screen(s) (e.g., graphical UI (GUI), touch screen GUI), input(s), output(s), keyboard, mouse, trackpad, etc., that can be part of or associated with a display component or an HMI, wherein the one or more UIs can be employed to receive input from a user (e.g., operator, maintenance technician, etc.) or present information relating to the industrial environment (e.g., information relating to the project files associated with industrial automation systems, information relating to the devices, processes, assets, etc. in an industrial environment, etc.) to the user.

The design management component 802 can include a security component 824 that can secure information associated with the design platform (e.g., comprising the design management component 802), project files of respective authorized entities, controller components, industrial automation systems, etc. The security component 824 can utilize desired data security and authentication techniques (e.g., authentication and/or data cryptography techniques) to facilitate securing the information so that only authorized entities are able to access the information. In some implementations, the security component 824 can be employed to authenticate or verify entities attempting to access the design management component 802 or communication device 800, a project file, an application, information (e.g., objects, custom data, etc.) associated with (e.g., stored in or secured by) the design management component 802, devices or components associated with the design management component 802 or communication device 800, etc. The security component 824 can register different entities, and can assign respective (e.g., different) entities respective unique user identification (ID) numbers and/or respective unique authentication credentials.

The security component 824 can receive authentication credentials (e.g., username, password, personal identification number (PIN), radio frequency identification (RFID) information, smart card information, and/or biometric authentication credentials (e.g., fingerprint information, information relating to facial recognition, information relating to an eye scan, etc.), etc.) from an entity, for example, via the UI component 822. For instance, the authentication credentials can be provided to the UI component 822 by an entity using a touch screen interface, keyboard or keypad, mouse, biometric interface, magnetic stripe reader, RFID reader, bar code reader (e.g., scanner), smart card reader, or other desired interface of the UI component. In an embodiment, the entity can have an ID card (e.g., employee ID card, RFID tag, and/or smart card, etc.) that can comprise the entity's authentication credentials, or a portion thereof (e.g., stored on the ID card).

In response to receiving authentication credentials from an entity, e.g., via the UI component 822, the security component 824 can compare the received authentication credentials to stored valid authentication credentials (e.g., stored in the data store 828) to determine whether the received authentication credentials are valid (e.g., determine whether the received authentication credentials match any or corresponding stored valid authentication credentials). If the received authentication credentials match any of the stored valid authentication credentials, the security component 824 can determine or identify that the received authentication credentials are valid and the associated entity can be determined to be authenticated. In response to validating received authentication credentials, the security component 824 can determine or identify the entity associated with the authentication credentials; determine or identify a subset of access rights that can be granted to an authenticated entity to access the design management component 802 or communication device 800, a project file, a private section of an object or a project, a public section of an object or a project, an application, information (e.g., objects, custom data, etc.) associated with the design management component 802, devices or components associated with the design management component 802 or communication device 800, etc.; and/or determine or identify a subset of entity preferences associated with the entity.

The security component 824 can determine the subset of access rights based at least in part on the identity of an entity, a role (e.g., system designer, system technician, supervisor, project manager, security personnel, etc.) of the entity with respect to the project or an industrial automation system, the authentication credentials of the entity, the type or level of security associated with the information, device, or component, etc. For example, the security component 824 can grant a first subset of access rights to a first entity (e.g., a first authenticated and authorized entity) to enable the first entity to access a first portion of the design management component 802 or communication device 800, a project file (e.g., a first project file), a private section (e.g., a first portion of a private section) of an object or a project, a public section (e.g., a first portion of a public section) of the object or project, an application (e.g., a first application), information (e.g., objects, custom data, etc.) associated with the design management component 802 (e.g., first subset of information), and/or devices or components associated with the design management component 802 or communication device 800, etc., based at least in part on the first identity of the first entity, a first role of the first entity with respect to the project or an industrial automation system, the first authentication credentials of the first entity, and/or the first type or first level of security associated with the information, device, or component, etc. The security component 824 can grant a second subset of access rights to a second entity (e.g., a second authenticated and authorized entity) to enable the second entity to access a second portion of the design management component 802 or communication device 800, a project file (e.g., a second project file), a private section (e.g., a second portion of a private section) of an object or a project, a public section (e.g., a second portion of a public section) of the object or project, an application (e.g., a second application), information (e.g., objects, custom data, etc.) associated with the design management component 802 (e.g., second subset of information), and/or devices or components associated with the design management component 802 or communication device 800, etc., based at least in part on the second identity of the second entity, a second role of the second entity with respect to the project or an industrial automation system, the second authentication credentials of the second entity, and/or the second type or second level of security associated with the information, device, or component, etc. The first subset of access rights can be different from (or the same as) the second access rights.

Also, for instance, the first entity can be a designer associated with a project and the second entity can be an application developer that develops applications for use with regard to projects. The security component 824 can grant the first subset of access rights to the first entity that can enable the first user to generate and associate custom data to associate such custom data with an object(s) in a project file that the first entity is authorized to access and modify, in accordance with the first subset of access rights, but may not allow the first entity to create applications or access application design or generation mechanisms, tools, interfaces, applets, etc., that can be used to create applications. The security component 824 also can grant the second subset of access rights to the second entity that can enable the second entity to create applications or access application design or generation mechanisms, tools, interfaces, applets, etc., that can be used to create applications, in accordance with the second subset of access rights, but may not allow the second entity to generate and associate custom data and associate such custom data with an object(s) in a project file that the second entity is not authorized to access and modify.

If the received authentication credentials of an entity do not match any of the stored valid authentication credentials, the security component 824 can determine that the received authentication credentials are not valid and the security component 824 can deny the entity access to the design management component 802 or communication device 800, a project file, an application, information (e.g., objects, custom data, etc.) associated with the design management component 802, and/or devices or components associated with the design management component 802 or communication device 800, etc. In such instance, the security component 824 can facilitate prompting the entity to attempt to provide valid authentication credentials up to a defined maximum number of access attempts, wherein, if the maximum number of attempts is reached without valid authentication credentials being presented, further attempts to access the design management component 802 or communication device 800, a project file, an application, information (e.g., objects, custom data, etc.) associated with the design management component 802, and/or devices or components associated with the design management component 802 or communication device 800, etc., can be denied for at least a defined amount of time or until a defined security response action (e.g., an unlock code is received by the entity from the security component 824 and provided by the entity to the security component 824 to restart the access attempts, the communication device 800 or design management component 802 is shut down and re-booted, etc.) is performed, and/or a notification of the authentication failure can be communicated to a desired entity (e.g., plant manager, supervisor, project manager, security person, etc.).

In an aspect, the communication device 800 can comprise a processor component 826 that can be associated with (e.g., communicatively connected to) the design management component 802, wherein the processor component 826 can operate in conjunction with the other components (e.g., communicator component 804, aggregator component 806, analyzer component 808, etc.) of the communication device 800 to facilitate performing the various functions of the communication device 800. The processor component 826 can employ one or more processors, microprocessors, or controllers that can process data, such as information relating to: objects; projects; industrial automation systems; custom data (e.g., custom object attributes) associated with objects; respective entity preferences of respective entities; authentication credentials and/or entity identifier information of entities; applications; security of the design management component 802 or communication device 800, a project file, a private section of an object or a project, a public section of an object or a project, an application, information (e.g., objects, custom data, etc.) associated with the design management component 802, and/or devices or components associated with the design management component 802 or communication device 800, etc.; controlling communication of data between the communication device 800 and other devices or components (e.g., data management component, library component, controller component, etc.); information relating to other operations of the communication device 800; and/or other information, etc., to facilitate operation of the communication device 800, as more fully disclosed herein, and control data flow between the communication device 800 and other components (e.g., data management component, library component, controller component, etc.) associated with the communication device 800.

The communication device 800 also can contain a data store 828 that can store data structures (e.g., user data, code, control data, metadata), code structure(s) (e.g., modules, objects, hashes, classes, procedures) or instructions, information relating to: objects; projects; industrial automation systems; custom data (e.g., custom object attributes) associated with objects; respective entity preferences of respective entities; authentication credentials and/or entity identifier information of entities; applications; security of the design management component 802 or communication device 800, a project file, a private section of an object or a project, a public section of an object or a project, an application, information (e.g., objects, custom data, etc.) associated with the design management component 802, and/or devices or components associated with the design management component 802 or communication device 800, etc.; controlling communication of data between the communication device 800 and other components (e.g., data management component, library component, controller component, etc.); etc., to facilitate controlling operations associated with the communication device 800. In an aspect, the processor component 826 can be functionally coupled (e.g., through a memory bus) to the data store 828 in order to store and retrieve information desired to operate and/or confer functionality, at least in part, to the components of the communication device 800 (e.g., communicator component 804, aggregator component 806, analyzer component 808, etc.), and/or substantially any other operational aspects of the communication device 800.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems described above, example methods that can be implemented in accordance with the disclosed subject matter can be better appreciated with reference to flowcharts in FIGS. 9-12. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Figure 9:
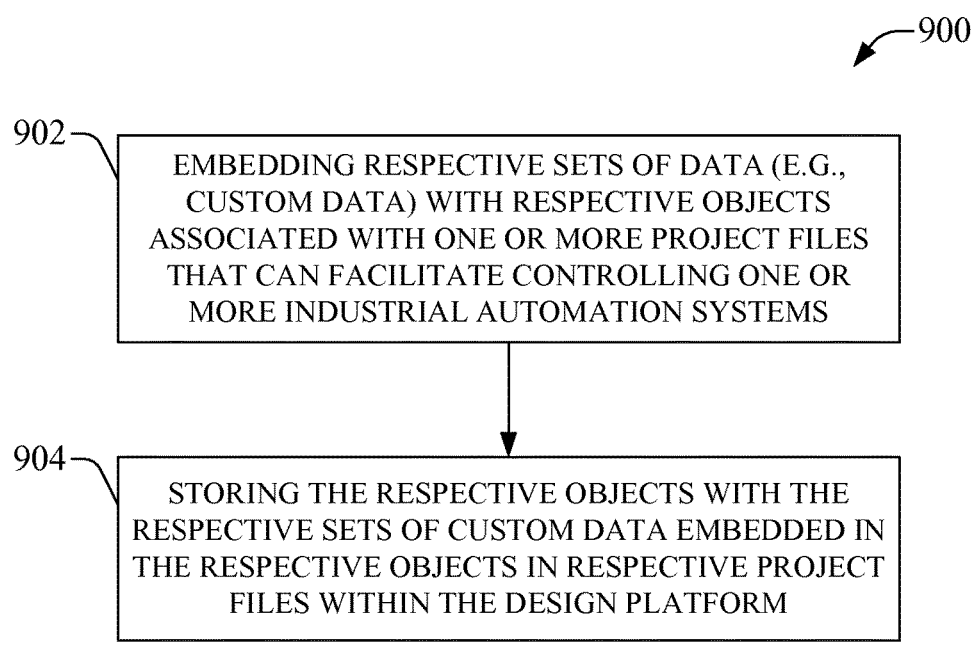
FIG. 9 illustrates a flow diagram of an example method for embedding data (e.g., custom data) with objects associated with a project file in connection with designing, configuring, and programming controllers, other devices, and/or components to facilitate controlling an industrial automation system, in accordance with various aspects and implementations of the disclosed subject matter.

FIG. 9 is a diagram of a flowchart of an example method 900 for embedding data (e.g., custom data) with objects associated with a project file in connection with designing, configuring, and programming controllers, other devices, and/or components to facilitate controlling an industrial automation system, in accordance with various aspects and implementations of the disclosed subject matter. The method 900 can be implemented by a design platform that can comprise a design management component.

At 902, respective sets of data (e.g., custom data) can be embedded with respective objects associated with one or more project files that can facilitate controlling one or more industrial automation systems. The design management component can receive respective data, such as respective sets of custom data, via a data management component(s), from respective authorized entities, wherein the data also can indicate which set of custom data is to be embedded with which object. The design management component can analyze the respective sets of data to determine which set of custom data is to be embedded with which object, for each object and each set of custom data. The design management component can embed or inject each set of custom data with or to its associated object. A set of custom data can comprise information (e.g., contextual information, comments, parameter-related data, warnings or alerts, reminders, design progress information, help menu information, operation information, etc.) that can be meaningful or useful to an authorized entity with respect to the object with which the set of custom data is embedded, wherein, for example, different authorized entities can desire different types of custom data for objects and/or different types of custom data can be useful or meaningful for different types of objects, and data can be customized and/or tailored based at least in part on the authorized entities (e.g., entity's ID, entity's role, entity's authentication information or access rights, etc.) and/or object (e.g., object type, object group, object function, etc.).

At 904, the respective objects with the respective sets of custom data embedded in the respective objects can be stored in respective project files within the design platform (e.g., comprising the data management component). The design management component can store the respective objects and the respectively embedded sets of custom data in respective project files, which can be stored in the data store of the design management component with the design platform. The design management component also can share (e.g., communicate, load) a project file, or portion thereof, comprising an object(s) and its embedded set(s) of custom data with (e.g., to, into) a controller component, comprising one or more controllers, to facilitate designing, configuring, or programming one or more controllers to operate, as desired, to facilitate controlling of an industrial automation system by the controller component.

Figure 10:
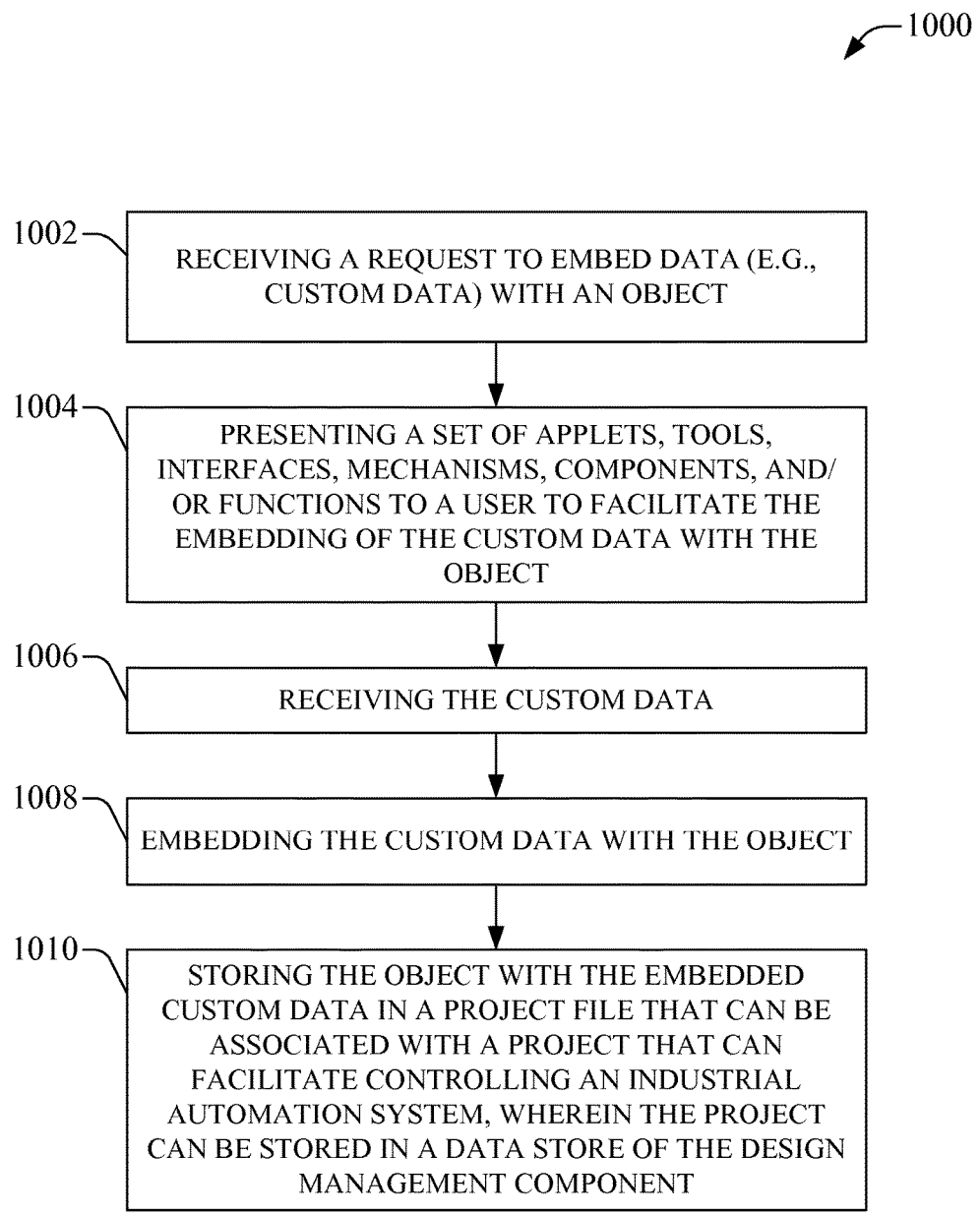
FIG. 10 presents a flow diagram of another example method for embedding data (e.g., custom data) with objects associated with a project file in connection with designing, configuring, and programming controllers, other devices, and/or components to facilitate controlling an industrial automation system, in accordance with various aspects and implementations of the disclosed subject matter.

FIG. 10 presents a flow diagram of another example method 1000 for embedding data (e.g., custom data) with objects associated with a project file in connection with designing, configuring, and programming controllers, other devices, and/or components to facilitate controlling an industrial automation system, in accordance with various aspects and implementations of the disclosed subject matter. The method 1000 can be implemented by a design platform that can comprise a design management component.

At 1002, a request to embed data (e.g., custom data) with an object can be received. When an authorized entity desires to embed custom data with a particular object, the authorized entity can use a data management component, which can be external to the design platform, to send a request to embed data with the object to the design management component, which can receive the request. The custom data can be data that the authorized entity determines to be useful or meaningful to the authorized entity with respect to the object with which the custom data is to be embedded pursuant to the request. The custom data can be data generated by the authorized entity (e.g., using the data management component or another component) or can be other data.

At 1004, a set of applets, tools, interfaces, mechanisms, components, and/or functions can be presented to the authorized entity to facilitate the embedding of the custom data with the object. The design management component can present, provide, expose, or otherwise make available the set of applets, tools, interfaces, mechanisms, components, and/or functions to the authorized entity, e.g., via the data management component, to facilitate the embedding of the custom data with the object. The authorized entity can utilize the set of applets, tools, interfaces, mechanisms, components, and/or functions to facilitate communicating the custom data to the design management component and/or embedding the custom data with the object.

At 1006, the custom data can be received. The design management component can receive the custom data from the data management component in connection with the request. The request can include the custom data or the custom data can be received separately from the request, for example, in response to the use or manipulation of the set of applets, tools, interfaces, mechanisms, components, and/or functions by the authorized entity.

At 1008, the custom data can be embedded with the object. The design management component can embed or inject the custom data with or to the object, in accordance with the request and/or in response to the use or manipulation of the set of applets, tools, interfaces, mechanisms, components, and/or functions by the authorized entity.

At 1010, the object with the embedded custom data can be stored in a project file that can be associated with a project that can facilitate controlling an industrial automation system, wherein the project can be stored in a data store of the design management component. The design management component can store the object with the embedded custom data in the project file that can be stored in the data store. For example, using the set of applets, tools, interfaces, mechanisms, components, and/or functions, the authorized entity can request or can facilitate the storage of the object with the embedded custom data in the project file in the data store, and, in response, the design management component can store the object with the embedded custom data in the project file in the data store.

Figure 11:
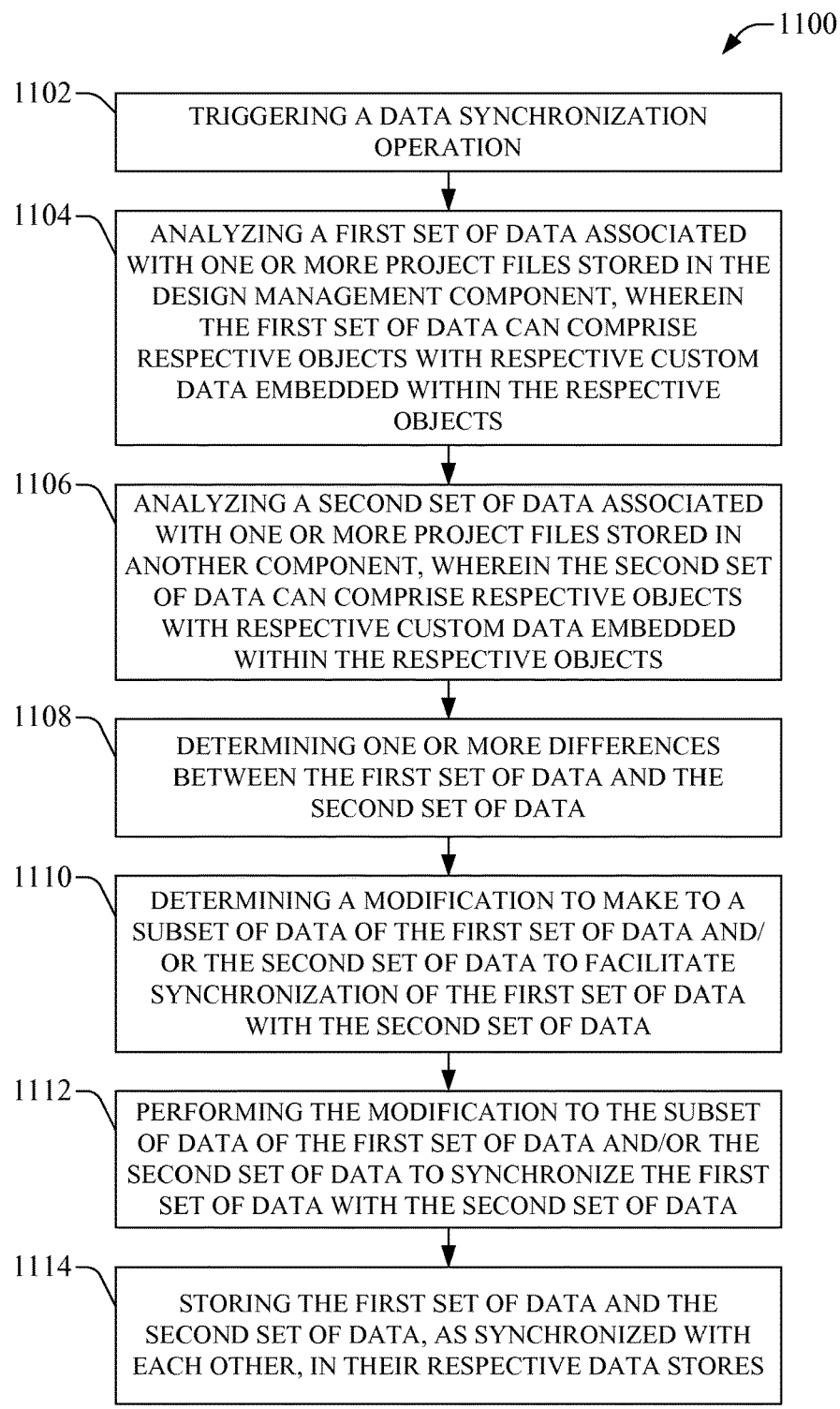
FIG. 11 illustrates a flow diagram of an example method for synchronizing data, including custom data embedded in objects, between the design management component and other components, in accordance with aspects of the disclosed subject matter.

In some implementations, the design management component and/or the set of applets, tools, interfaces, components, and/or functions can be employed (e.g., by the authorized entity) to load the project file, including the object with the embedded custom data, into a controller (e.g., online or offline controller) of the controller component. The controller can store the project file in its data store, wherein the information in the project file can be used to design, configure, or program the controller for use in controlling an associated industrial automation system, or portion thereof. Also, as desired, an authorized entity can access and view (e.g., via a desired interface, such as an HMI) information, including the object with the embedded custom data, loaded into the controller. In other implementations, embedding respective custom data with or in objects associated with a project file(s) can facilitate or enhance library management, system virtualization for testing and emulation, enabling data exchange between applications, version management, etc., as more fully disclosed herein FIG. 11 illustrates a flow diagram of an example method 1100 for synchronizing data, including custom data embedded in objects, between the design management component and other components (e.g., data management component, controller component, library management component, etc.), in accordance with aspects of the disclosed subject matter. The method 1100 can be implemented by a design platform that can comprise a design management component.

At 1102, a data synchronization operation can be triggered. A data synchronization operation can be triggered, for example, in response to a command or request (e.g., via the design management component, data management component, controller component, or library management component, etc.), in response to a synchronization triggering event (e.g., in response to a determination that a change to an object or project file has occurred), or periodically (e.g., at defined time intervals).

At 1104, a first set of data associated with one or more project files stored in the design management component (e.g., in a data store therein) can be analyzed, wherein the first set of data can comprise respective objects with respective custom data embedded within the respective objects. At 1106, a second set of data associated with one or more project files stored in another component (e.g., data management component, controller component, or library management component, etc.) can be analyzed, wherein the second set of data can comprise respective objects with respective custom data embedded within the respective objects. The design management component can analyze the first set of data and/or can analyze or facilitate analyzing the second set of data to facilitate determining or identifying differences between the first set of data and the second set of data. In some implementations, the design management component can coordinate or operate in conjunction with the other component (e.g., data management component, controller component, or library management component, etc.) to facilitate the analyzing of the second set of data.

At 1108, one or more differences between the first set of data and the second set of data can be determined. The design management component (and/or the other component) can determine or identify one or more differences between the first set of data and the second set of data. The differences between the sets of data can relate to, for example, differences between custom data associated with an object in the first set of data and custom data associated with a corresponding object in the second set of data, or differences between design-related, configuration-related, or programming-related data (e.g., objects, logic, instructions, commands, parameters, etc.) in the first set of data and the design-related, configuration-related, or programming-related data in the second set of data, etc.

At 1110, determining a modification to make to a subset of data of the first set of data and/or the second set of data to facilitate synchronization of the first set of data with the second set of data. The design management component can determine a modification or an update to make to a subset of data of the first set of data and/or the second set of data to facilitate the synchronization of the first set of data with the second set of data. For example, if certain data, comprising an object with embedded custom data, of the first set of data is newer or a most recent version, is valid, and/or is determined to be more desirable (e.g., optimal, more acceptable, etc.) than the corresponding data in the second set of data, the design management component can determine that the corresponding data in the second set of data is to be modified or updated using the certain data in the first set of data, such that the corresponding data (e.g., the subset of data) can be replaced with the certain data in the first set of data, to facilitate synchronizing the first set of data with the second set of data.

At 1112, the modification to the subset of data of the first set of data and/or the second set of data can be performed to synchronize the first set of data with the second set of data. The design management component can modify or facilitate the modifying of the subset of data of the first set of data and/or the second set of data to synchronize the first set of data with the second set of data, in accordance with the determined modification. When the data modification involves modification of a subset of data in the second set of data in the other component, the design management component can communication the certain data to be used in the modification of the subset of data and/or other information (e.g., data modification instructions) to the other component to facilitate the modifying of the subset of data of the second set of data to synchronize the first set of data with the second set of data.

At 1114, the first set of data and the second set of data, as synchronized with each other, can be stored in their respective data stores. The design management component can store the first set of data, as synchronized with the second set of data, in the data store of the design management component. The other component can store the second set of data, as synchronized with the first set of data, in the data store of the other component.

Figure 12:
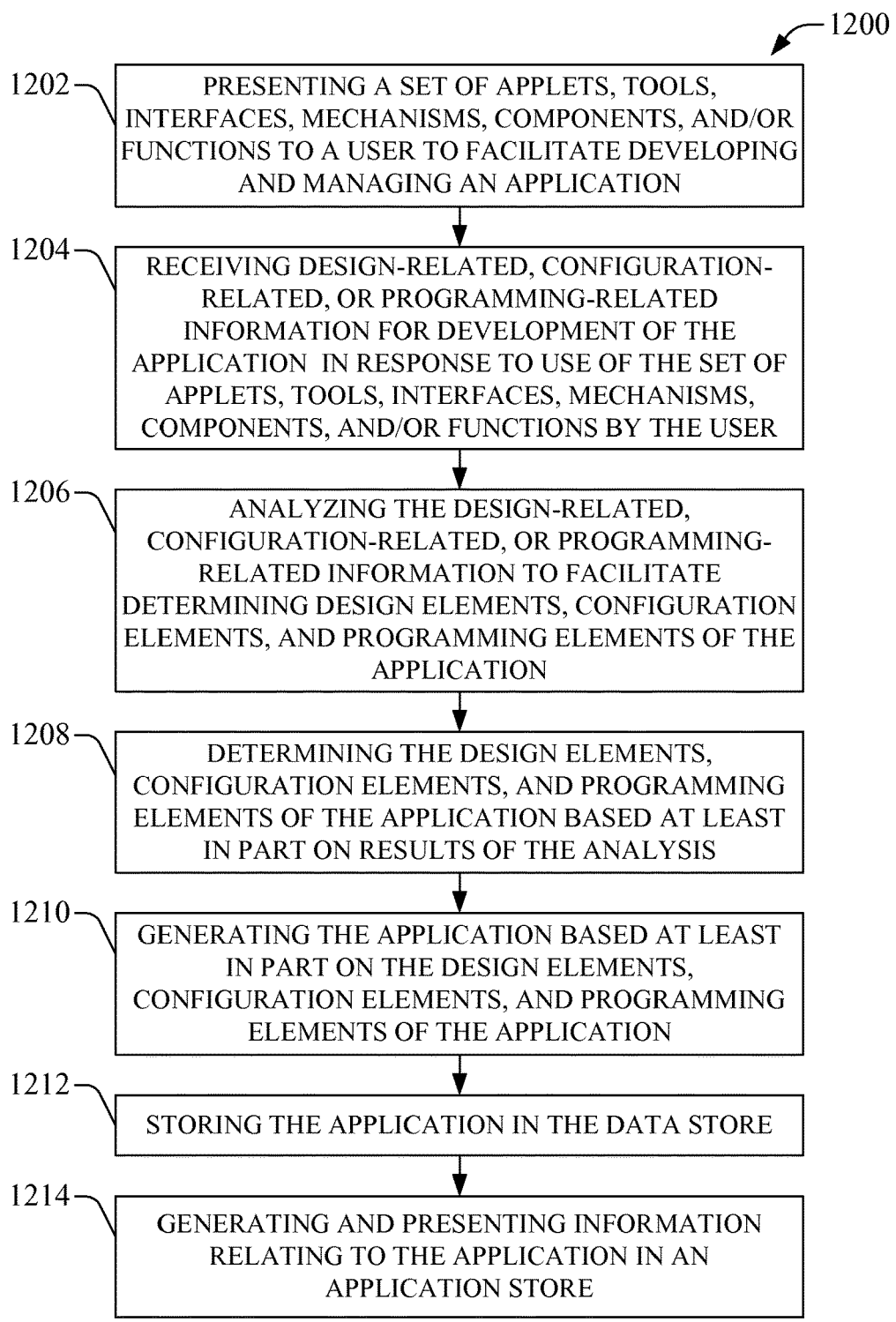
FIG. 12 depicts a flow diagram of an example method for developing and managing applications that can be used in connection with generating project files relating to industrial automation systems, in accordance with aspects of the disclosed subject matter.

FIG. 12 depicts a flow diagram of an example method 1200 for developing and managing applications that can be used in connection with generating project files relating to industrial automation systems, in accordance with aspects of the disclosed subject matter. The method 1200 can be implemented by a design platform that can comprise a design management component, At 1202, a set of applets, tools, interfaces, mechanisms, components, and/or functions can be presented to the authorized entity to facilitate developing and managing an application. The design management component can present, provide, expose, or otherwise make available the set of applets, tools, interfaces, mechanisms, components, and/or functions to the authorized entity, e.g., via the data management component, to facilitate the developing and managing of the application. Via the design management component and/or the data management component, the authorized entity can utilize the set of applets, tools, interfaces, mechanisms, components, and/or functions to facilitate designing, creating, or configuring programs, routines, modules, components, functions, features, menus, icons, etc., and the arrangement, logic, connections, etc., of such programs, routines, modules, components, functions, features, menus, icons, etc., in relation to each other to create an application can that perform desired operations or functions on data. For example, an application can be designed or structured so that it can perform desired operations or functions on data to facilitate the creation of project files and/or the programming of controllers in a manner that can be useful and beneficial to a particular industry or to a particular type of industrial device or process. As another example, an application can be designed or structured so that it can perform desired operations or functions on data to facilitate providing new applets, tools, interfaces, mechanisms, components, and/or functions that can be used to create other applications in a desirable manner (e.g., an application that provides features and functions that can make creating new applications easier).

At 1204, design-related, configuration-related, or programming-related information for development of the application can be received in response to use (e.g., manipulation, selection, operation, etc.) of the set of applets, tools, interfaces, mechanisms, components, and/or functions by the authorized entity. The design management component can receive the design-related, configuration-related, or programming-related information for development of the application, wherein such information can be generated based at least in part on the use of the set of applets, tools, interfaces, mechanisms, components, and/or functions by the authorized entity.

At 1206, the design-related, configuration-related, or programming-related information can be analyzed to facilitate determining design elements, configuration elements, and programming elements of the application. At 1208, the design elements, configuration elements, and programming elements of the application can be determined based at least in part on results of the analysis. The design management component can analyze the design-related, configuration-related, or programming-related information can be analyzed to facilitate determining the design elements, configuration elements, and programming elements of the application. The design elements, configuration elements, and programming elements can relate to objects, components, parameters, interrelationships between components and/or configuration of components with respect to each other, and/or other features of the application. Based at least in part on the analysis results, the design management component can determine the design elements, configuration elements, and programming elements of the application.

At 1210, the application can be generated based at least in part on the design elements, configuration elements, and programming elements of the application. The design management component can generate the application based at least in part on the design elements, configuration elements, and programming elements of the application.

At 1212, the application can be stored in a data store. The design management component can store the application in the data store of the design management component. In some implementations, the design management component can provide (e.g., communicate, download) the application to another component (e.g., data management component, controller component, library management component, etc.).

At 1214, information relating to the application can be generated and presented in an application store. The design management component can generate information relating to the application, and can present (e.g., display) the information in the application data store. An authorized entity, e.g., using the data management component, can access the application store via the application store component of the design management component and can view the information relating to the application in the data store via a UI component. The information can comprise, for example, a name and description of the application, system requirements for use of the application on a device, a size of the application file, a screen shot(s) depicting aspects or features of the application, a cost (if any) of the application, and/or other information.

One or more methods disclosed throughout the subject specification and annexed drawings are capable of being stored on an article of manufacture to facilitate transporting and transferring such method(s) to computers or chipsets with processing capability(ies) for execution, and thus implementation, by a processor, or for storage in a memory. In an aspect, one or more processors that enact method(s) described herein can be employed to execute computer-executable code instructions retained in a memory, or any computer-readable or machine-readable medium, to implement method(s) described herein; the code instructions, when executed by the one or more processor implement or carry out the various acts in the method(s) described herein. The computer-executable code instructions provide a computer-executable or machine-executable framework to enact, or implement, the method(s) described herein.

Figure 13:
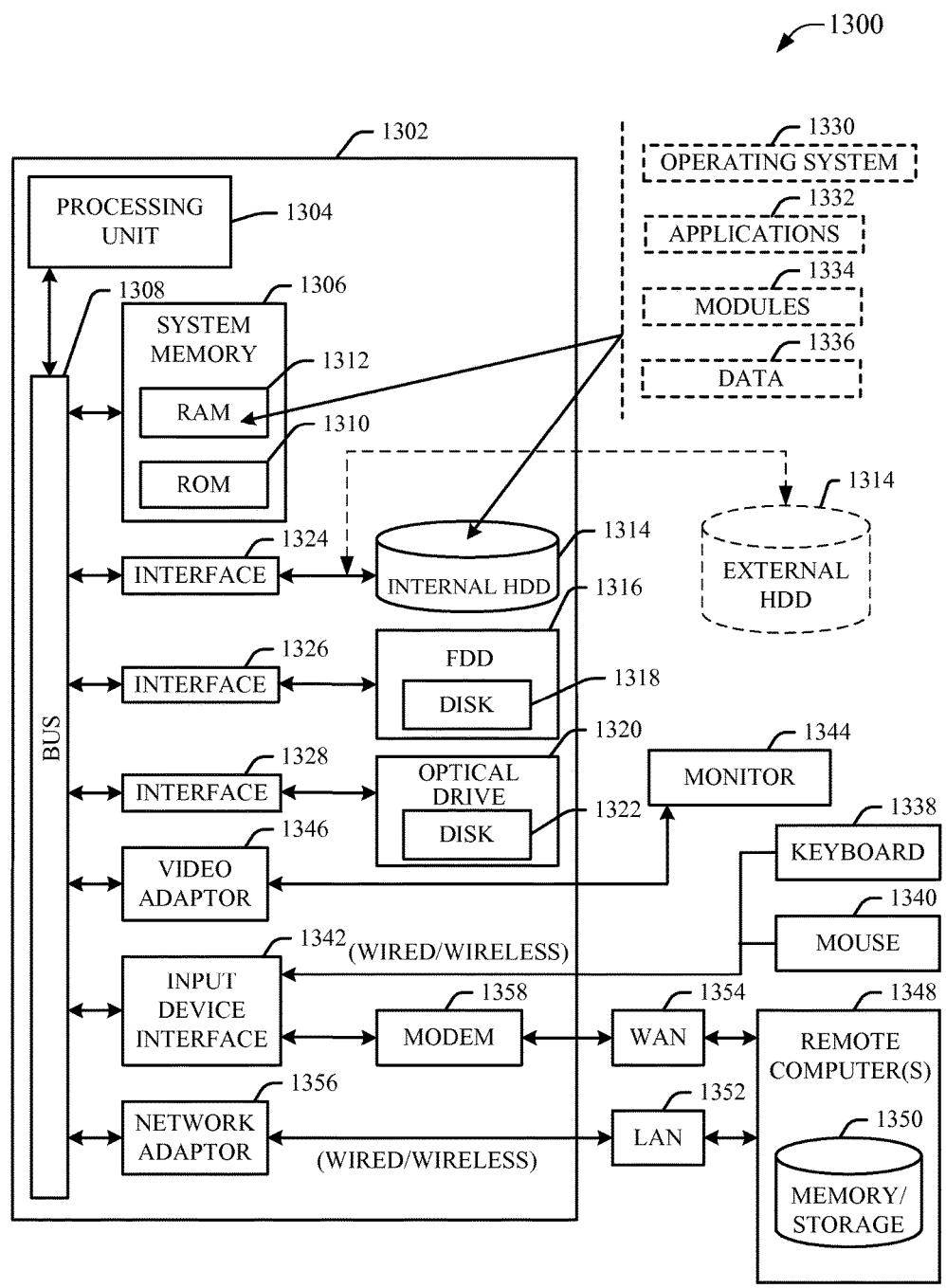
FIG. 13 depicts a block diagram of a computer operable to execute the disclosed architecture.

Referring now to FIG. 13, there is illustrated a block diagram of a computer operable to execute the disclosed architecture. In order to provide additional context for various aspects thereof, FIG. 13 and the following discussion are intended to provide a brief, general description of a suitable computing environment 1300 in which the various aspects of the disclosed subject matter can be implemented. While the description above is in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter also can be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

A computer and computing devices in general typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (e.g., external DDD), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Interface 1324 enables functional coupling of computer 1302 to a removable memory, such as a USB memory device or a SD memory card. Other external drive connection technologies are within contemplation of the disclosed subject matter.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the disclosed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the disclosed subject matter can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are illustrative and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4, 3.6, and 5 GHz radio bands, at up to an 11 Mbps (802.11a), 54 Mbps (802.11b or 802.11b), or 150 Mbps (802.11n) data rate, for example, or with products that contain both bands (dual band), so the networks can provide real-world performance similar to the basic 10BaseT wired Ethernet networks used in many offices.

Figure 14:
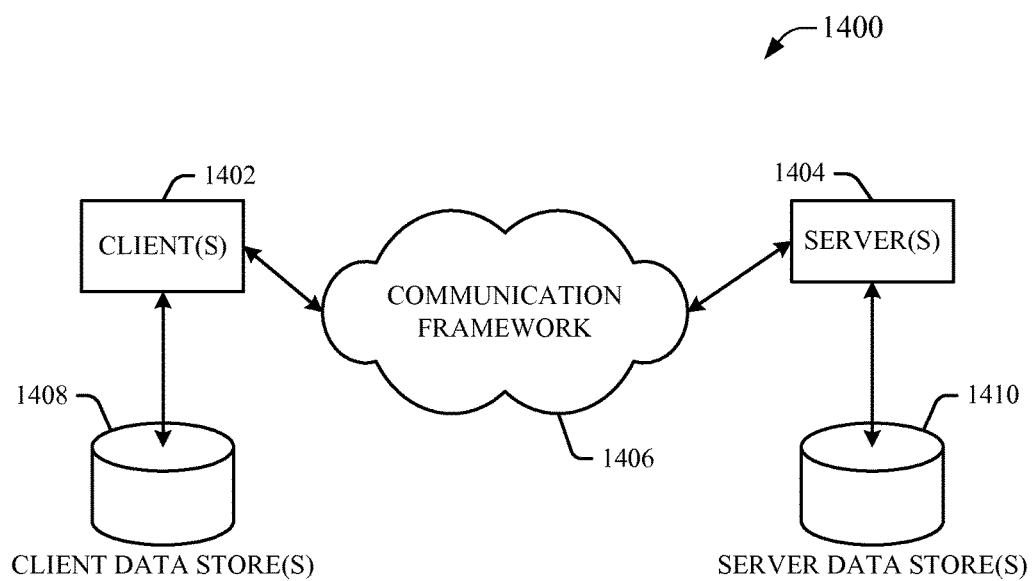
FIG. 14 illustrates a schematic block diagram of an example computing environment.

Referring now to FIG. 14, there is illustrated a schematic block diagram of an example computing environment 1400 in accordance with another aspect. The system 1400 includes one or more client(s) 1402. The client(s) 1402 can be hardware and/or software (e.g., threads, processes, computing devices). The client(s) 1402 can house cookie(s) and/or associated contextual information by employing the disclosed subject matter, for example.

The system 1400 also includes one or more server(s) 1404. The server(s) 1404 can also be hardware and/or software (e.g., threads, processes, computing devices, etc.). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) or associated contextual information). Similarly, the server(s) 1404 are operatively connected to one or more server data store(s) 1410 that can be employed to store information local to the servers 1404.

In the subject specification and annexed drawings, terms such as "repository," "store," "data store," data storage," and substantially any term(s) that conveys any other information storage component(s) relevant to operation and functionality of a functional element or component described herein, can refer to "memory components," or entities embodied in a "memory" or components comprising the memory. The memory components described herein can be either volatile memory or nonvolatile memory, or can include both volatile and nonvolatile memory. In addition, the memory components described herein can be statically affixed (screwed, bolted, soldered, etc.) or removably affixed. Further, the memory components can include computer-readable or machine-readable storage media.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device (e.g., a PAC), discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the operations or acts of a method or algorithm described in connection with the aspects disclosed herein can be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a authorized entity terminal or HMI. In the alternative, the processor and the storage medium may reside as discrete components in a user terminal or HMI. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of the disclosed subject matter. It is, of course, not possible to describe every conceivable combination of components and/or methods, but one of ordinary skill in the art may recognize that many further combinations and permutations are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory that stores computer-executable components;
   a processor, operatively coupled to the memory, that executes computer-executable components, the computer-executable components comprising:
      a data store that stores a project file comprising a set of objects that is usable to control of an industrial automation system; and
      a design management component that:
         embeds a set of metadata within an object of the set of objects, wherein the set of metadata provides contextual information related to the object and is customized according to a particular entity, and wherein the object, including the set of data embedded within the object, is stored in the project file in the data store, and wherein, in response to execution, the object facilitates generation of control information that facilitates the control of at least a portion of the industrial automation system, and
         in response to detection of a modification to the object that invalidates a customized portion of the metadata, generates a warning indicating the invalidation of the customized portion of the metadata.

2. The system of claim 1, wherein the set of objects comprises at least one of a controller, a tag, a member, an add-on instruction, a program, a routine, or a ladder rung in the program.

3. The system of claim 1, wherein the set of metadata is customized based at least in part on at least one of a preference of the entity or a characteristic of the object.

4. The system of claim 3, wherein the set of metadata comprises at least one of a set of assistance data that provides assistance to an entity with respect to the object, a set of version data that provides information relating to a version of the object, a set of modification data that indicates a modification made to the object with respect to the version of the object, a set of description data that describes a function or a feature of the object with respect to a project associated with the project file, a set of reminder data that facilitates reminding the entity or another entity of a status of the object or an action to perform with respect to the object or the project, status or alert information relating to the status or an alert associated with an object, a set of progress data that describes an amount of progress that has been made with respect to the object or the project, event-related information associated with the object, or a set of other data relating to the entity preference.

5. The system of claim 1, wherein the design management component is part of a design platform, and the design management component receives the set of metadata from a data management component that is external to the design platform.

6. The system of claim 1, wherein the design management component provides a set of mechanisms, components, applications, applets, tools, or interfaces that facilitate at least one of formatting the set of metadata, validating the set of metadata, embedding the set of metadata within the object, creating the object, editing the object, setting a parameter associated with the object, or modifying the parameter associated with the object.

7. The system of claim 1, wherein the design management component transfers at least a portion of the project file, comprising the object and the set of metadata embedded within the object, to the controller component, wherein the controller component comprises one or more controllers that respectively are online or offline.

8. The system of claim 1, wherein the design management component facilitates management of version information associated with the project file based at least in part on respective sets of metadata embedded within respective objects of the set of objects, wherein the respective sets of metadata comprise the set of metadata, and the respective objects comprise the object, and wherein the version information indicates at least one of a version of the object or object features associated with the object in the version of the object.

9. The system of claim 1, wherein the computer-executable components further comprise a virtualization component that virtualizes at least a portion of the industrial automation system based at least in part on the project file comprising the object, including the set of metadata embedded within the object.

10. The system of claim 9, wherein the computer-executable components further comprise a testing component that facilitates simulated operation of a modified portion of at least the portion of the industrial automation system, based at least in part on the virtualization of the modified portion of at least the portion of the industrial automation system, to test the modified portion, wherein the modified portion relates to the object, and the virtualization of the modified portion is based at least in part on the set of metadata embedded within the object.

11. The system of claim 9, wherein the computer-executable components further comprise an emulation component that emulates at least the portion of the industrial automation system based at least in part on the virtualization of at least the portion of the industrial automation system.

12. The system of claim 1, wherein the computer-executable components further comprise:
an application component that provides a set of mechanisms, tools, functions, interfaces, components, or applets that are usable to facilitate design, development, or generation of an application, wherein the application is usable to facilitate design, configuration, or programming of a project represented by the project file to facilitate the control of the industrial automation system; and
an application store component that provides the application or information relating to the application.

13. The system of claim 1, wherein the design management component facilitates management of a library associated with the design management component, wherein the library comprises the set of objects, the set of metadata, a different version of the set of objects, or a different version of the set of metadata.

14. The system of claim 13, wherein the design management component is part of a design platform, and wherein the design management component facilitates synchronization of the set of objects and the set of metadata associated with the design management component with information stored by at least one of a data management component that is external to the design platform, a library component that is part of the design platform or external to the design platform, or a controller component associated with the data management component.

15. The system of claim 1, wherein the set of metadata embedded within the object facilitates an exchange of information relating to a set of project files, comprising the project file, between a first application and a second application, to facilitate design, configuration, or programming of the set of objects or another set of objects associated with another project file of the set of project files to facilitate the control of the industrial automation system.

16. A method, comprising:
embedding, by a system comprising a processor, a set of metadata relating to an object within the object, wherein the set of metadata provides contextual information related to the object and is customized according to a particular entity, and wherein the object is associated with a project file that relates to an industrial automation system;
storing, by the system, the object, including the set of metadata embedded within the object, in the project file, wherein information, comprising the object, stored in the project file is usable to facilitate controlling the industrial automation system, and wherein, in response to executing of the object, the object facilitates generating control data that facilitates the controlling of at least a portion of the industrial automation system; and
in response to detection of a modification to the object that invalidates a customized portion of the metadata, generating a warning indicating the invalidation of the customized portion of the metadata.

17. The method of claim 16, wherein the project file comprises a set of objects, comprising the object, and wherein the set of objects comprises at least one of a controller, a tag, a member, an add-on instruction, a program, a routine in the program, or a ladder rung in the program.

18. The method of claim 16, further comprising:
facilitating customizing, by the system, the set of metadata based at least in part on at least one of an entity preference of the entity or the object with which it is embedded.

19. The method of claim 16, wherein the method further comprises:
presenting, by the system, at least one of the set of metadata that is embedded within the object or a link to the set of metadata, in response to accessing the object in the project file.

20. The method of claim 16, further comprising:
providing, by the system, a set of mechanisms, components, applications, applets, tools, or interfaces that facilitate embedding the set of metadata within the object.

21. The method of claim 16, further comprising:
communicating, by the system, at least a portion of the project file, comprising the object and the set of metadata embedded within the object, to one or more controllers.

22. The method of claim 16, further comprising:
managing, by the system, version information associated with the project file based at least in part on respective sets of metadata embedded with respective objects of a set of objects, wherein the respective sets of metadata comprise the set of metadata, and the set of objects comprises the object, and wherein the version information indicates at least one of a version of the object or object features associated with the object in the version of the object.

23. The method of claim 16, further comprising:
facilitating virtualizing, by the system, at least a portion of the industrial automation system based at least in part on information in the project file, comprising the object and the set of metadata embedded within the object, to facilitate testing of at least a portion of the industrial automation system, testing of a modification to at least the portion of the industrial automation system, or emulation of at least the portion of the industrial automation system.

24. The method of claim 16, further comprising:
providing, by the system, a set of mechanisms, tools, functions, interfaces, components, or applets that are usable to facilitate designing, developing, or generating an application that is usable to facilitate designing, configuring, or programming a project represented by the project file, to facilitate controlling operation of the industrial automation system; and
presenting, by the system, the application or information relating to the application in an application store.

25. The method of claim 16, further comprising:
facilitating synchronizing, by the system, respective objects of a set of objects, comprising the object, and respective sets of data, comprising the set of metadata, associated with a design management component with information stored by at least one of a data management component, a library, or a controller, wherein the respective sets of metadata are embedded in the respective objects.

26. A non-transitory computer-readable medium storing instructions that, in response to execution, cause a system comprising a processor to perform operations, comprising:
integrating a set of metadata relating to an object within the object to generate a data-integrated object, wherein the object is associated with a project file associated with an industrial automation system;
storing the data-integrated object in the project file, wherein information, comprising the data-integrated object, stored in the project file is usable to facilitate controlling the industrial automation system, and wherein the set of metadata integrated with the data-integrated object provides contextual information relating to the data-integrated object and is customized according to a particular entity, and wherein, in response to executing of the data-integrated object, the data-integrated object facilitates generating control information that facilitates the controlling of at least a portion of the industrial automation system; and
in response to detection of a modification to the data-integrated object that invalidates a customized portion of the metadata, generating a warning indicating the invalidation of the customized portion of the metadata.

27. The non-transitory computer-readable medium of claim 26, wherein the project file comprises a set of objects, comprising the object, and wherein the set of objects comprises at least one of a controller, a tag, a member, an add-on instruction, a program, a routine in the program, or a ladder rung in the program.

* * * * *